(12) United States Patent
Yoshida

(10) Patent No.: US 12,743,786 B2
(45) Date of Patent: Sep. 22, 2026

(54) IMAGE PROCESSING DEVICE, IMAGE FORMING APPARATUS, AND EDGE DETECTION METHOD

(71) Applicant: Atsushi Yoshida, Kanagawa (JP)

(72) Inventor: Atsushi Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 228 days.

(21) Appl. No.: 18/663,538

(22) Filed: May 14, 2024

(65) Prior Publication Data

US 2024/0412376 A1 Dec. 12, 2024

(30) Foreign Application Priority Data

Jun. 9, 2023 (JP) ................................ 2023-095877

(51) Int. Cl.

*G06T 7/13* (2017.01)
*G06T 5/20* (2006.01)
*G06V 10/75* (2022.01)
*G06V 30/414* (2022.01)

(52) U.S. Cl.

CPC ................. *G06T 7/13* (2017.01); *G06T 5/20* (2013.01); *G06V 10/751* (2022.01); *G06V 30/414* (2022.01)

(58) Field of Classification Search

CPC ... G06T 7/13; G06T 5/20; G06T 2207/10008; G06T 2207/30176; G06V 10/751; G06V 30/414

USPC ........................................................ 382/199

See application file for complete search history.

(56) References Cited

U.S. PATENT DOCUMENTS

| | | | |
|---|---|---|---|
| 2020/0252513 A1 | 8/2020 | Nakada et al. | |
| 2020/0296255 A1* | 9/2020 | Hashimoto | H04N 1/00718 |
| 2020/0336615 A1* | 10/2020 | Ono | G06V 10/243 |

FOREIGN PATENT DOCUMENTS

| | | |
|---|---|---|
| JP | 2014-072626 A | 4/2014 |
| JP | 2018-137521 A | 8/2018 |
| JP | 2018-157417 A | 10/2018 |
| JP | 2020-123940 A | 8/2020 |

* cited by examiner

*Primary Examiner* — Stephen P Coleman
(74) *Attorney, Agent, or Firm* — Harness, Dickey & Pierce, P.L.C.

(57) ABSTRACT

An image processing device includes a processing circuit, a detection circuit, a setting circuit, and a decision circuit. The processing circuit obtains, from image data of a document read by a reading device, a value relating to a difference between pixel values of adjacent pixels in a direction from a background portion to a document portion in the image data. The detection circuit searches for a pixel in the direction and detects an edge, which indicates a boundary between the background portion and the document portion, based on the value relating to the difference. The setting circuit sets the detected edge as a first edge or a second edge. The decision circuit decides the second edge as a document edge of the document.

16 Claims, 20 Drawing Sheets

DOCUMENT
92
7
READING LINE

FIG. 5

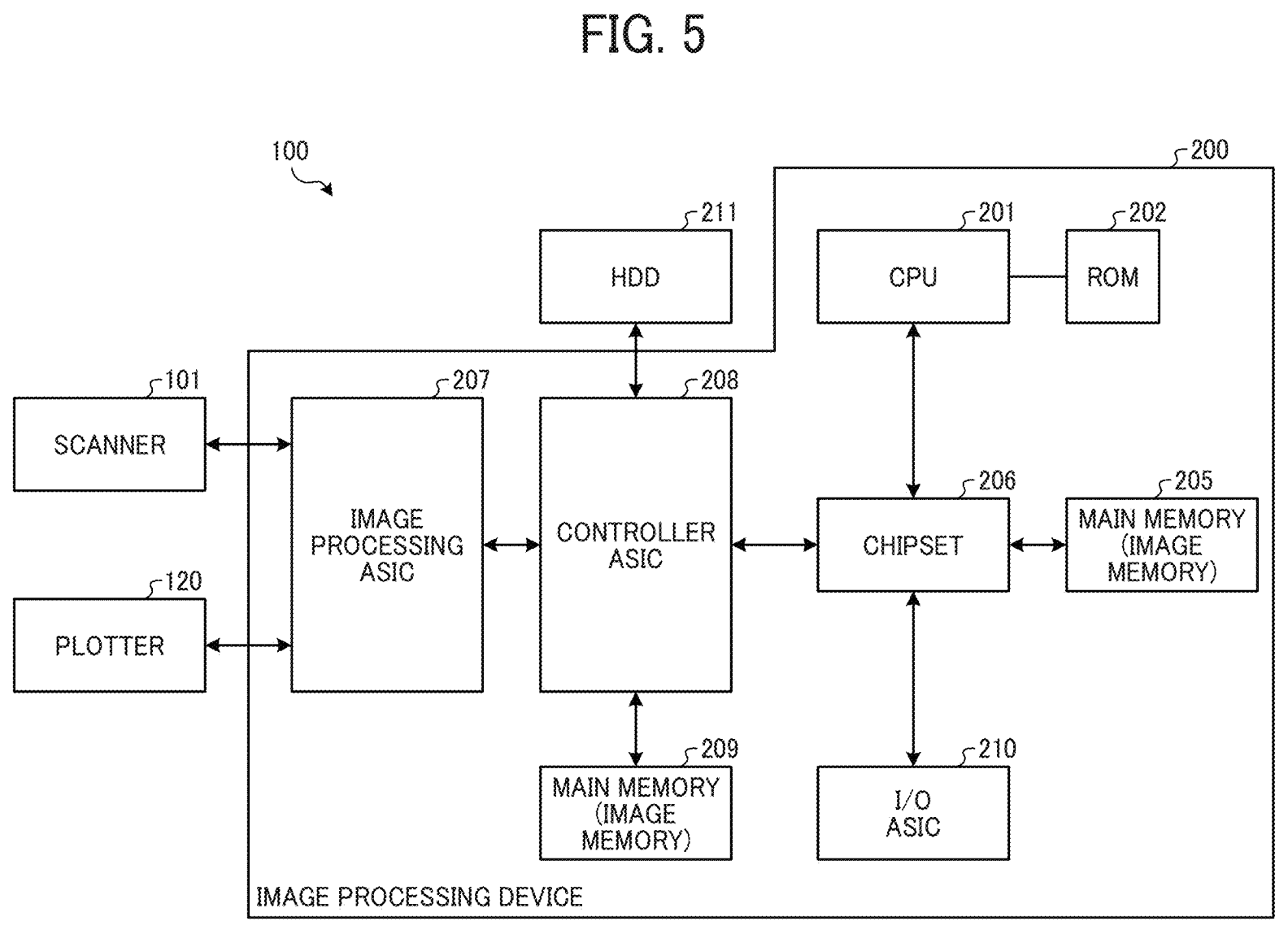

100
200
201 CPU
202 ROM
205 MAIN MEMORY (IMAGE MEMORY)
206 CHIPSET
210 I/O ASIC
211 HDD
208 CONTROLLER ASIC
209 MAIN MEMORY (IMAGE MEMORY)
207 IMAGE PROCESSING ASIC
IMAGE PROCESSING DEVICE
101 SCANNER
120 PLOTTER

FIG. 6

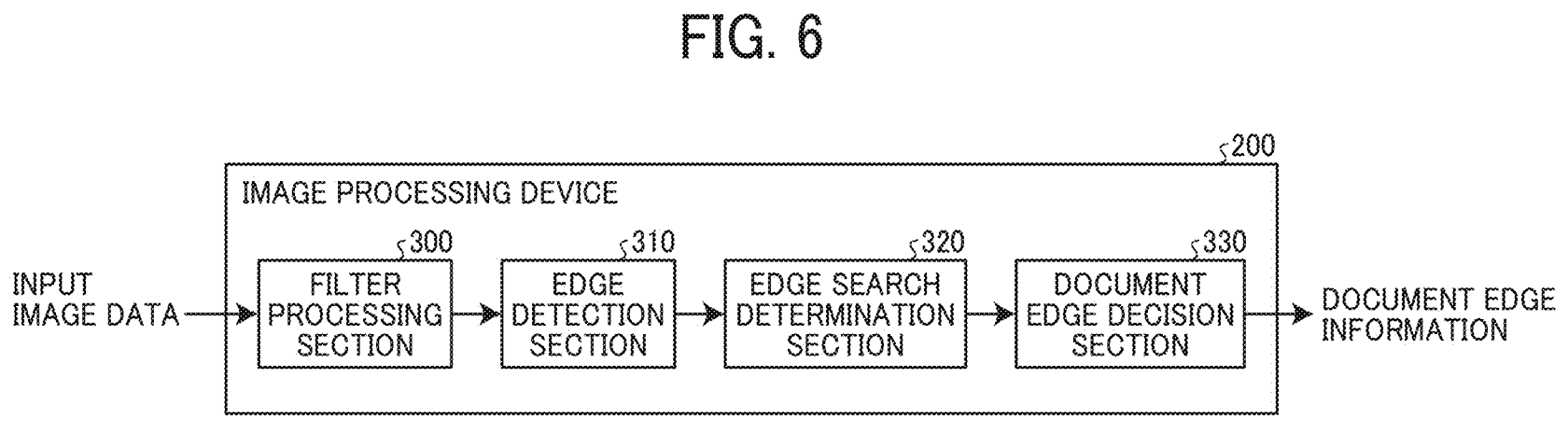

IMAGE PROCESSING DEVICE 200

INPUT IMAGE DATA

300 FILTER PROCESSING SECTION

310 EDGE DETECTION SECTION

320 EDGE SEARCH DETERMINATION SECTION

330 DOCUMENT EDGE DECISION SECTION

DOCUMENT EDGE INFORMATION 500
501
400
402
401
CONVEYANCE DIRECTION
(SUB-SCANNING DIRECTION)

FIG. 8

| | | | | |
|---|---|---|---|---|
| 1 | 1 | 1 | 1 | 1 |
| 1 | 1 | 1 | 1 | 1 |
| 0 | 0 | 0 | 0 | 0 |
| −1 | −1 | −1 | −1 | −1 |
| −1 | −1 | −1 | −1 | −1 |

400
600
402
401

PIXEL VALUE
BACKGROUND
DOCUMENT SHADOW
WHITE DOCUMENT
SUB-SCANNING POSITION

DIFFERENTIAL AMOUNT
−a
a
510
511

400
401a
402a
CONVEYANCE DIRECTION (SUB-SCANNING DIRECTION)
PIXEL VALUE
SUB-SCANNING POSITION
BACKGROUND
DOCUMENT SHADOW
WHITE DOCUMENT
DIFFER-ENTIAL AMOUNT
a
−a
520
521

DIFFER-
ENTIAL
AMOUNT
530
531
a
-a
PIXEL
VALUE
BACKGROUND
DOCUMENT
SHADOW
BLACK
DOCUMENT
SUB-SCANNING
POSITION
400
411
412
CONVEYANCE
DIRECTION
(SUB-SCANNING
DIRECTION)

400
412a
421
TITLE
411a
CONVEYANCE DIRECTION
(SUB-SCANNING DIRECTION)

PIXEL VALUE
SUB-SCANNING POSITION
BACKGROUND
DOCUMENT SHADOW
BLACK DOCUMENT

DIFFER-ENTIAL AMOUNT
a
-a
540
541

200a
IMAGE PROCESSING DEVICE
INPUT IMAGE DATA
300
FILTER PROCESSING SECTION
310
EDGE DETECTION SECTION
340
CONSECUTIVE EDGE DETECTION COUNT SECTION
320
EDGE SEARCH DETERMINATION SECTION
330
DOCUMENT EDGE DECISION SECTION
DOCUMENT EDGE INFORMATION

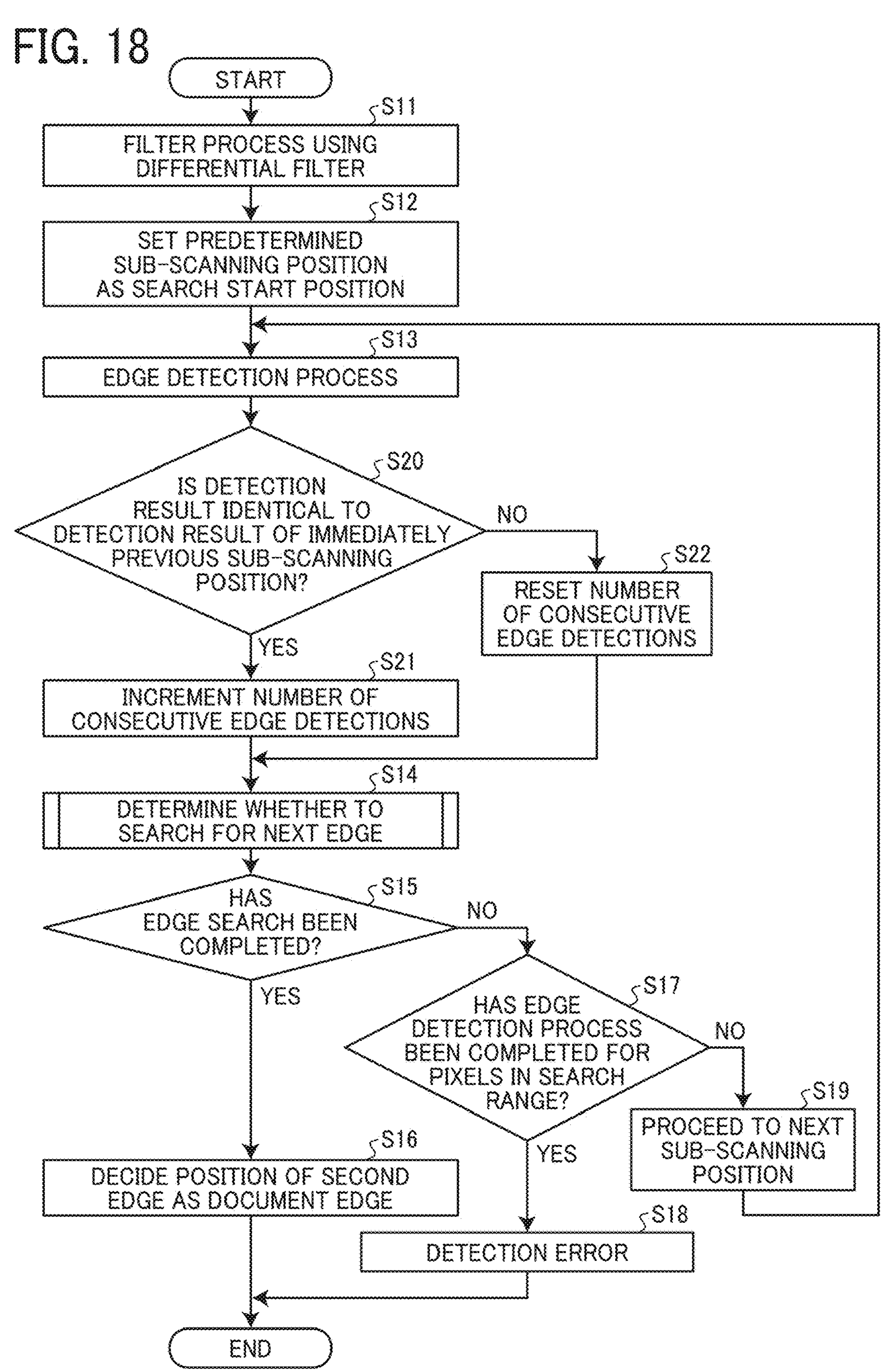
FIG. 18
START
S11
FILTER PROCESS USING DIFFERENTIAL FILTER
S12
SET PREDETERMINED SUB-SCANNING POSITION AS SEARCH START POSITION
S13
EDGE DETECTION PROCESS
S20
IS DETECTION RESULT IDENTICAL TO DETECTION RESULT OF IMMEDIATELY PREVIOUS SUB-SCANNING POSITION?
NO
S22
RESET NUMBER OF CONSECUTIVE EDGE DETECTIONS
YES
S21
INCREMENT NUMBER OF CONSECUTIVE EDGE DETECTIONS
S14
DETERMINE WHETHER TO SEARCH FOR NEXT EDGE
S15
HAS EDGE SEARCH BEEN COMPLETED?
NO
YES
S17
HAS EDGE DETECTION PROCESS BEEN COMPLETED FOR PIXELS IN SEARCH RANGE?
NO
S19
PROCEED TO NEXT SUB-SCANNING POSITION
YES
S16
DECIDE POSITION OF SECOND EDGE AS DOCUMENT EDGE
S18
DETECTION ERROR
END INPUT IMAGE DATA
IMAGE PROCESSING DEVICE
200b
300
FILTER PROCESSING SECTION
350
PIXEL VALUE DETERMINATION SECTION
310
EDGE DETECTION SECTION
320
EDGE SEARCH DETERMINATION SECTION
330
DOCUMENT EDGE DECISION SECTION
DOCUMENT EDGE INFORMATION

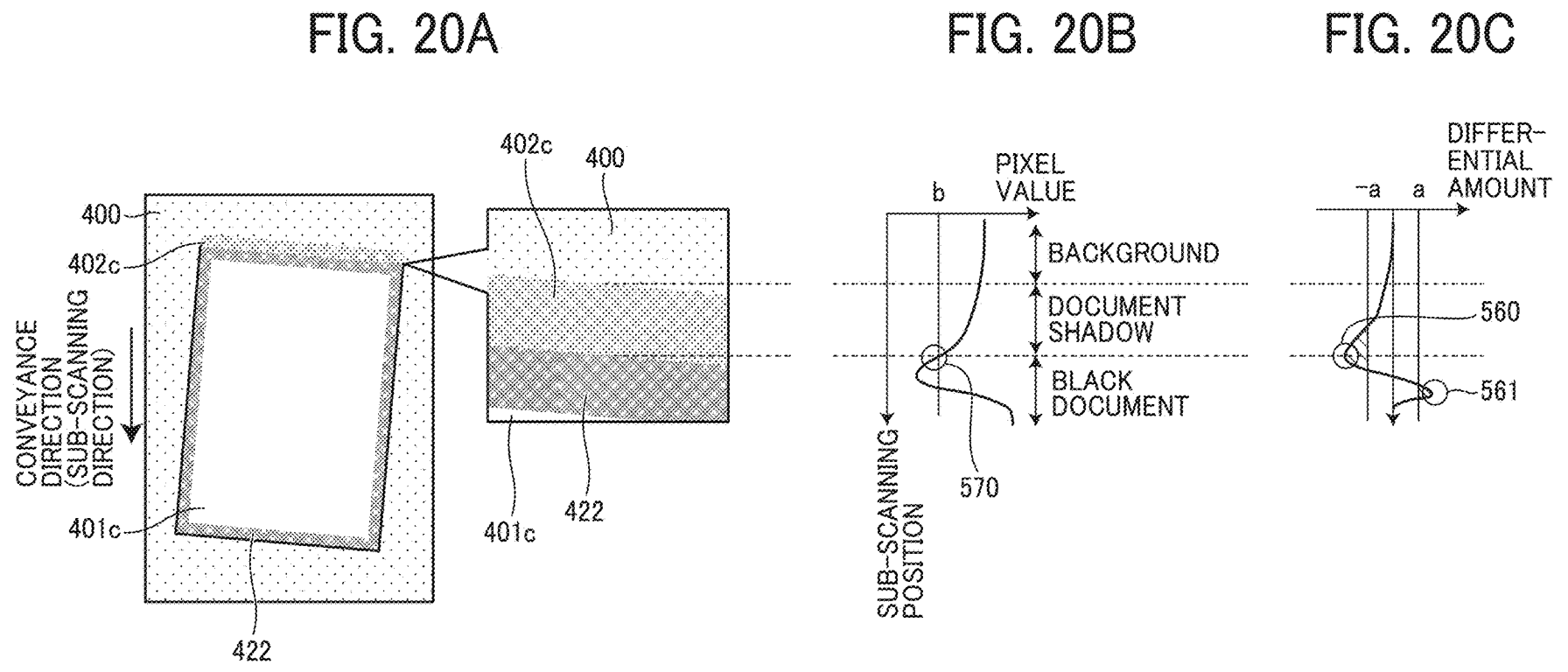

FIG. 20A 400
402c
422
401c
CONVEYANCE DIRECTION (SUB-SCANNING DIRECTION)

FIG. 20B

PIXEL VALUE
b
570
SUB-SCANNING POSITION
BACKGROUND
DOCUMENT SHADOW
BLACK DOCUMENT

FIG. 20C

DIFFERENTIAL AMOUNT
a
−a
560
561

IMAGE PROCESSING DEVICE, IMAGE FORMING APPARATUS, AND EDGE DETECTION METHOD

CROSS-REFERENCE TO RELATED APPLICATIONS

This patent application is based on and claims priority pursuant to 35 U.S.C. § 119 (a) to Japanese Patent Application No. 2023-095877, filed on Jun. 9, 2023, in the Japan Patent Office, the entire disclosure of which is hereby incorporated by reference herein.

BACKGROUND

Technical Field

The present disclosure relates to an image processing device, an image forming apparatus, and an edge detection method.

Related Art

Conventional image forming apparatuses such as copiers use a mechanical mechanism to correct a skew generated when an automatic document feeder (ADF) reads a document. Instead of such a mechanical mechanism, a recently known skew correction technique utilizes image processing. With such a skew correction technique utilizing image processing, an image forming apparatus can detect a skew angle from an image of a document that has been read with the document skewed and correct the skew by image processing based on the skew angle. In the skew correction technique utilizing image processing, a premise for detecting the skew angle is accurately detecting a document edge from the read image.

Conventionally, however, the skew correction technique utilizing image processing has been a technique that is premised on the correct detection of the boundary between a background and an object (document) to be detected. Therefore, failure to detect the boundary results in failure to detect a document edge, that is the boundary between the document and the shadow of the document.

SUMMARY

According to an embodiment of the present disclosure, an image processing device includes a processing circuit, a detection circuit, a setting circuit, and a decision circuit. The processing circuit obtains, from image data of a document read by a reading device, a value relating to a difference between pixel values of adjacent pixels in a direction from a background portion to a document portion in the image data. The detection circuit searches for a pixel in the direction and detects an edge based on the value relating to the difference. The edge indicates a boundary between the background portion and the document portion. When the detection circuit firstly detects the edge of a darkening change, the setting circuit sets the detected edge as a first edge. When the detection circuit detects the edge of the brightening change before detecting the first edge, the setting circuit sets the detected edge as a second edge. When the detection circuit detects the edge of the darkening change or the edge of the brightening change after detecting the first edge, the setting circuit sets the detected edge as the second edge. The decision circuit decides the second edge as a document edge of the document.

According to an embodiment of the present disclosure, an image forming apparatus includes the above-described image processing device and the reading device to read the document as the image data.

According to an embodiment of the present disclosure, an edge detection method includes obtaining, from image data of a document read by a reading device, a value relating to a difference between pixel values of adjacent pixels in a direction from a background portion to a document portion in the image data, searching for a pixel in the direction and detecting an edge based on the value relating to the difference, the edge indicating a boundary between the background portion and the document portion, and setting the detected edge as a first edge or a second edge. The setting includes, when the edge of a darkening change is firstly detected, setting the detected edge as the first edge, when the edge of the brightening change is detected before the first edge is detected, setting the detected edge as the second edge, and when the edge of the darkening change or the edge of the brightening change is detected after the first edge is detected, setting the detected edge as the second edge. The edge detection method further includes deciding the set second edge as a document edge of the document.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 3 is a diagram illustrating an example configuration of an automatic document feeder (ADF) of the image forming apparatus according to the first embodiment;

FIG. 4 is a diagram schematically illustrating a configuration of the ADF in the vicinity of a document reading position;

FIG. 5 is a diagram illustrating an example hardware configuration of an image processing device of the image forming apparatus according to the first embodiment;

FIG. 6 is a block diagram illustrating an example functional configuration of the image processing device of the image forming apparatus according to the first embodiment;

FIG. 8 is a diagram illustrating an example differential filter;

FIG. 18 is a flowchart illustrating an example flow of a document edge detection process performed by the image forming apparatus according to the third embodiment;

FIGS. 20A to 20C are diagrams for describing an operation of detecting a document edge of a white document when an image is printed in the vicinity of the document edge.

Figure 1:
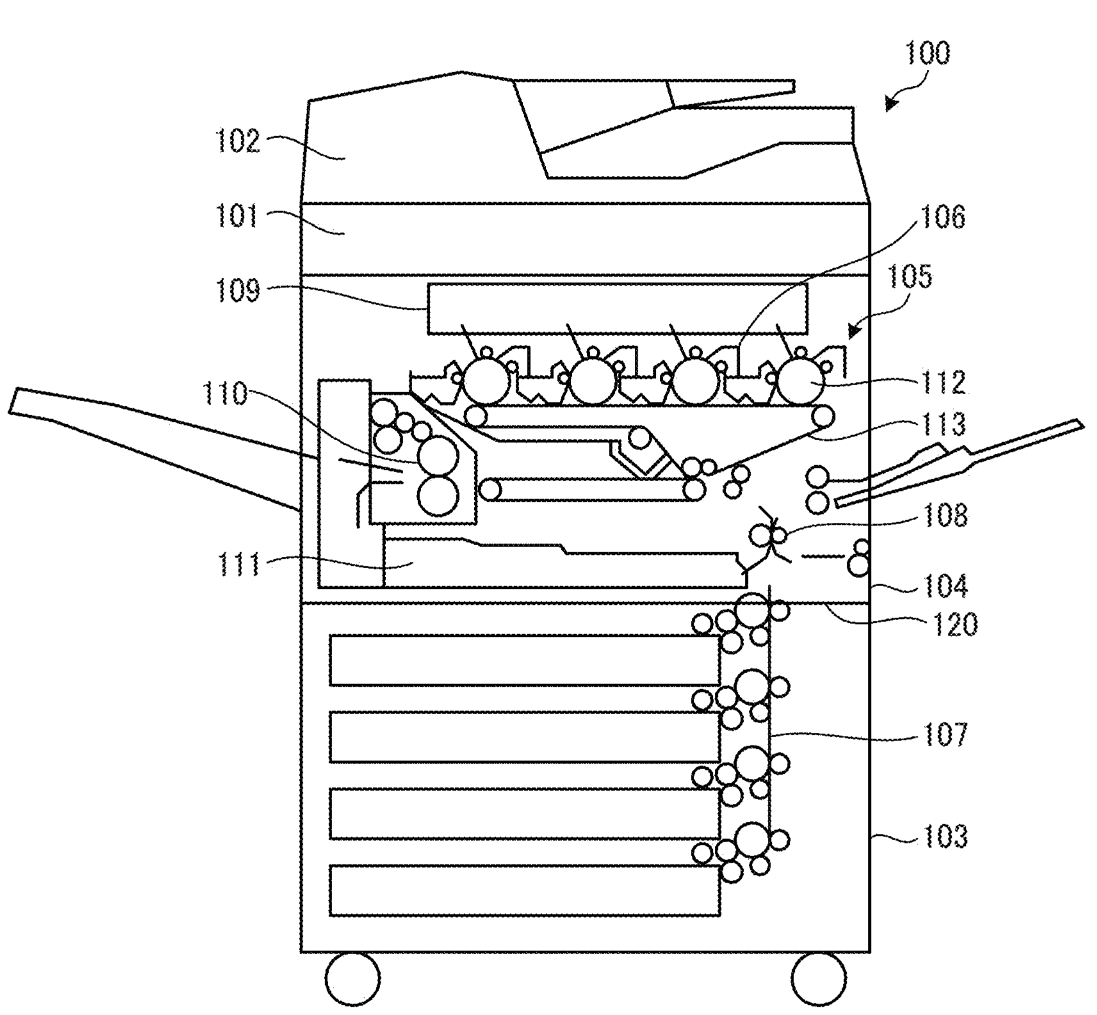
FIG. 1 is a diagram illustrating an example overall configuration of an image forming apparatus according to a first embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An image processing device, an image forming apparatus, and an edge detection method according to embodiments of the present disclosure are described in detail below with reference to the accompanying drawings. The present disclosure, however, is not limited to the following embodiments, and components of the following embodiments include components that can be easily conceived by those skilled in the art, those being substantially the same ones, and those being equivalent. Furthermore, various omissions, substitutions, changes, and combinations of the components can be made without departing from the gist of the following embodiments.

First Embodiment

Overall Configuration of Image Forming Apparatus

FIG. 1 is a diagram illustrating an example overall configuration of an image forming apparatus 100 according to a first embodiment. The overall configuration of the image forming apparatus 100 according to the present embodiment is described below with reference to FIG. 1.

The image forming apparatus 100 illustrated in FIG. 1 is a multifunction peripheral (MFP) having at least two functions among a copy function, a printer function, a scanner function, and a facsimile function. The image forming apparatus 100 includes an image processing device 200 described later. As illustrated in FIG. 1, the image forming apparatus 100 also includes a scanner 101 (reading device), an automatic document feeder (ADF) 102, a sheet feeder 103, and an apparatus body 104.

The image forming apparatus 100 includes a plotter 120 inside the apparatus body 104. The plotter 120 is one example of image forming means and includes a tandem image forming device 105, a registration roller pair 108, an optical writing device 109, a fixing device 110, and a duplex tray 111. The registration roller pair 108 conveys a recording sheet supplied from the sheet feeder 103 via a conveyance path 107 to the image forming device 105.

The image forming device 105 includes four photoconductor drums 112. The photoconductor drums 112 are arranged side by side and correspond to colors of yellow (Y), magenta (M), cyan (C), and key plate (black) (K), respectively. Each of the photoconductor drums 112 is surrounded by image forming components including a charger, a developing device 106, a transfer device, a cleaner, and a static eliminator.

The image forming device 105 further includes an intermediate transfer belt 113. The intermediate transfer belt 113 is stretched between a drive roller and a driven roller with the intermediate transfer belt 113 sandwiched at nips between the transfer devices and the photoconductor drums 112.

With the configuration described above, the tandem image forming apparatus 100 forms a full-color image on a recording sheet as follows. The scanner 101 reads a document, which is an object to be detected, fed by the ADF 102. Based on an image of the document, the optical writing device 109 optically writes a latent image onto each of the photoconductor drums 112, which correspond to the respective colors of YMCK. Each of the developing devices 106 develops the latent image into a toner image of the corresponding color. In a primary transfer process, these toner images are transferred to the intermediate transfer belt 113 one above the other in the order of Y, M, C, and K, for example, to form a full-color toner image. In a secondary transfer process, the full-color toner image is transferred to a recording sheet supplied from the sheet feeder 103. Subsequently, the fixing device 110 fixes the full-color toner image to the recording sheet. After that, the recording sheet is ejected.

Configuration of Scanner

Figure 2:
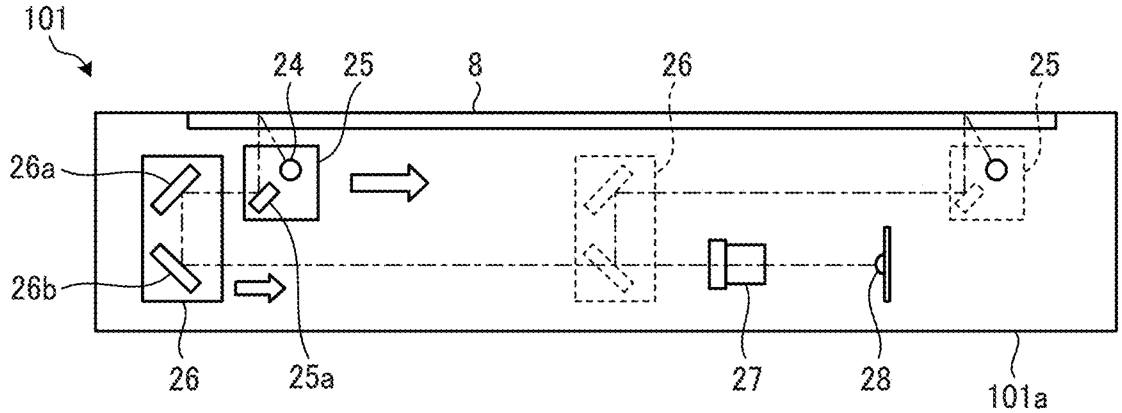
FIG. 2 is a diagram illustrating an example configuration of a scanner of the image forming apparatus according to the first embodiment.

FIG. 2 is a diagram illustrating an example configuration of the scanner 101 of the image forming apparatus 100 according to the first embodiment. The configuration of the scanner 101 of the image forming apparatus 100 according to the present embodiment is described with reference to FIG. 2.

The scanner 101 of the image forming apparatus 100 includes a first carriage 25, a second carriage 26, an image forming lens 27, and an imaging device 28, as illustrated in FIG. 2. Each of these components is disposed inside a body frame 101*a* of the scanner 101.

Inside the body frame 101*a* of the scanner 101, a first rail and a second rail are disposed so as to extend in a sub-scanning direction (a horizontal direction of FIG. 2). The first rail includes two rails spaced apart from each other by a predetermined distance in a main scanning direction orthogonal to the sub-scanning direction. The second rail has a similar configuration to that of the first rail.

The first carriage 25 is slidably attached to the first rail and reciprocated, by a drive motor, between a position indicated by a solid line illustrated in FIG. 2 and a position indicated by a broken line illustrated in FIG. 2 in the sub-scanning direction via a first carriage drive wire. The first carriage 25 includes a light source 24 and a first mirror 25*a*.

The second carriage 26 is slidably attached to the second rail and reciprocated, by a drive motor, between a position indicated by a solid line illustrated in FIG. 2 and a position indicated by a broken line illustrated in FIG. 2 in the sub-scanning direction via a second carriage drive wire. The second carriage 26 includes a second mirror 26*a* and a third mirror 26*b*.

The first carriage 25 and the second carriage 26 move in the sub-scanning direction at a speed ratio of 2:1. Due to such a difference of the moving speed, even when the first carriage 25 and the second carriage 26 move, the optical path length of the light from a document face of a document placed on an exposure glass 8 to the image forming lens 27 does not change.

The light reflected off the document enters the image forming lens 27 via the mirrors. The image forming lens 27 condenses the light to form an image on the imaging device 28. The imaging device 28 includes an imaging sensor such as a charge-coupled device (CCD) or a complementary metal oxide semiconductor (CMOS). The imaging device 28 photoelectrically converts the light reflection image of the document formed via the image forming lens 27 into an analog image signal and outputs the analog image signal as a read image.

Configuration of ADF

Figure 3:
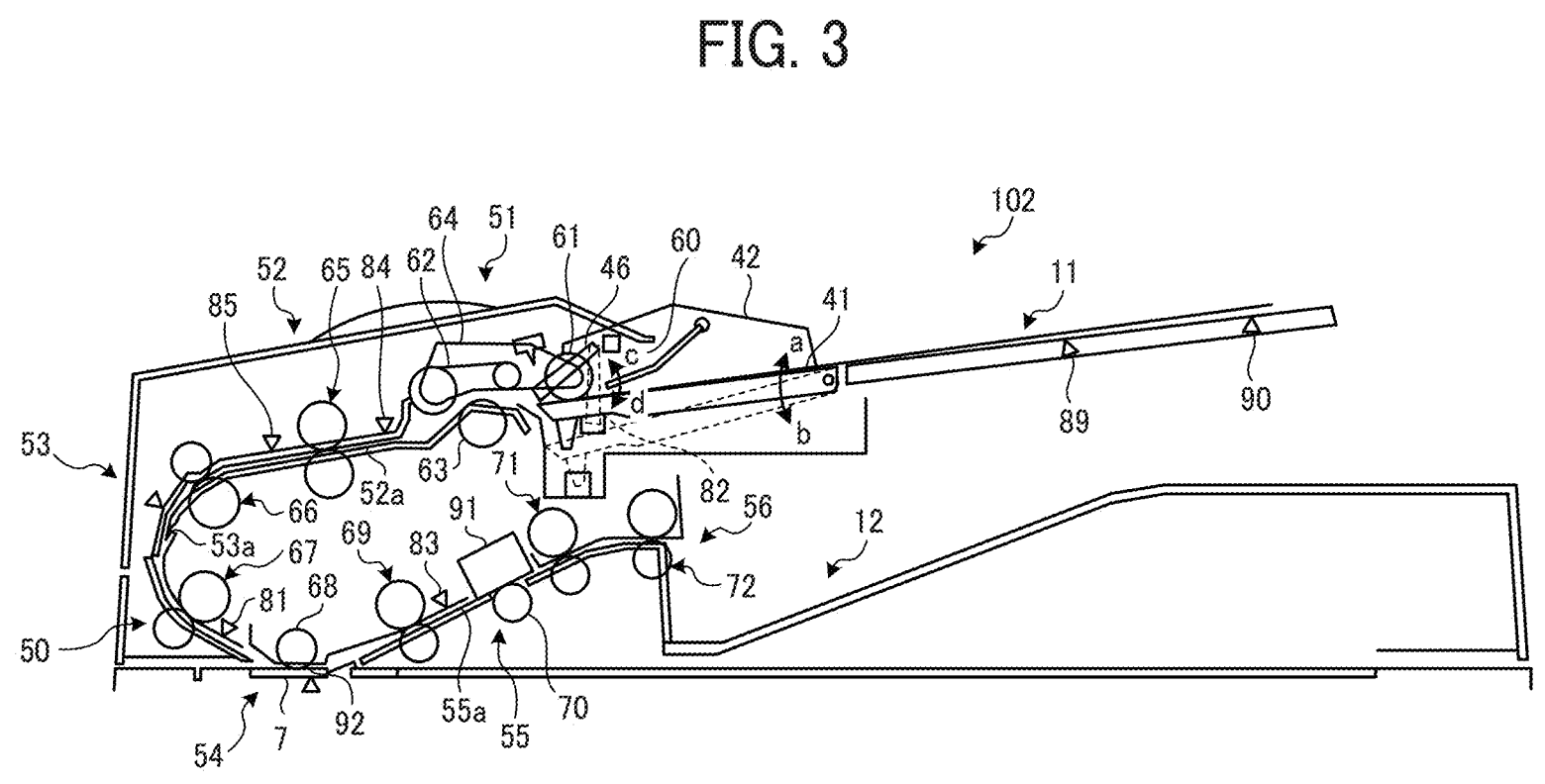
Figure 4:
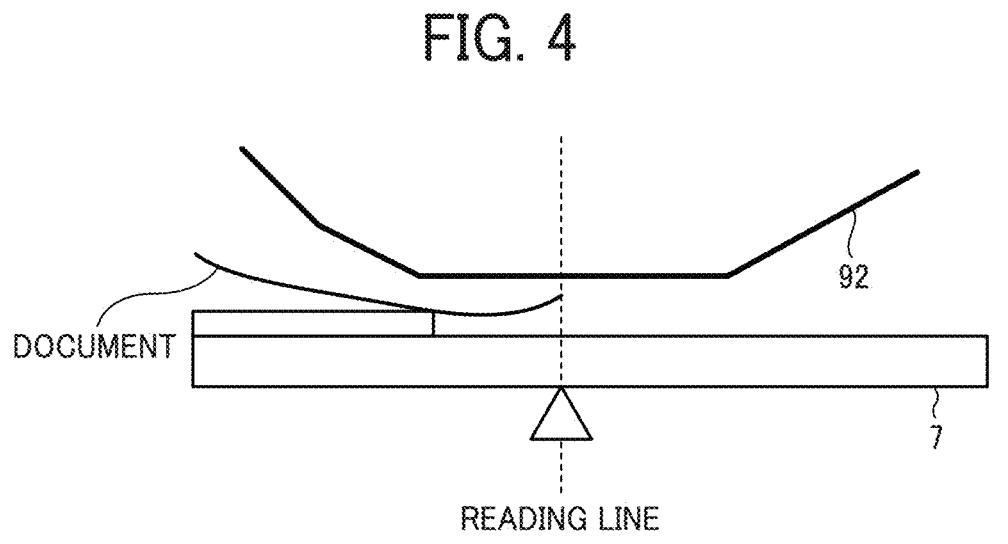

FIG. 3 is a diagram illustrating an example configuration of the ADF 102 of the image forming apparatus 100 according to the first embodiment. FIG. 4 is a diagram schematically illustrating a configuration of the ADF 102 in the vicinity of a document reading position. The configuration of the ADF 102 of the image forming apparatus 100 according to the present embodiment is described below with reference to FIGS. 3 and 4.

As illustrated in FIG. 3, the ADF 102 includes a document tray 11 on which a document is placed. The document tray 11 includes a movable document table 41 and a pair of side guide plates 42. The movable document table 41 turns in directions indicated by arrows "a" and "b" of FIG. 3 with its base end serving as a fulcrum. The pair of side guide plates 42 determines the left and right positions of the document in a sheet feeding direction. Turning of the movable document table 41 aligns a front end of the document in the sheet feeding direction to an appropriate height.

The document tray 11 is provided with document length detection sensors 89 and 90. The document length detection sensors 89 and 90 are disposed at a distance in the sheet feeding direction and detect whether the document is oriented vertically or horizontally. The document length detection sensors 89 and 90 may be reflective sensors that detect the orientation of the document without contact by optical means, or may be contact-type actuator sensors.

One of the pair of side guide plates 42 is slidable in the horizontal direction with respect to the sheet feeding direction to allow documents of different sizes to be placed.

The other of the pair of side guide plates 42 is fixed and provided with a set feeler 46. The set feeler 46 is provided with a document set sensor 82 and turns in response to the document being placed. The document set sensor 82 is disposed at a lowermost portion on a movement trajectory of a tip of the set feeler 46 and detects the placement of the document on the document tray 11. Specifically, the document set sensor 82 detects whether there is a document set on the ADF 102 based on whether the set feeler 46 has turned to be away from the document set sensor 82.

As illustrated in FIG. 3, the ADF 102 includes a conveyor 50. The conveyor 50 includes a separation feeder 51, a pull-out device 52, a turn device 53, a first reading conveyor 54, a second reading conveyor 55, and a sheet ejector 56. Each conveyance roller of the conveyor 50 is rotationally driven by one or more conveyance motors.

The separation feeder 51 includes a pickup roller 61, a sheet feeding belt 62, and a reverse roller 63. The pickup roller 61 is disposed in the vicinity of a sheet feeding port 60, which feeds a document. The sheet feeding belt 62 and the reverse roller 63 are disposed to face each other across a conveyance path.

The pickup roller 61 is supported by a supporting arm 64, which is attached to the sheet feeding belt 62. Driving a cam mechanism causes the pickup roller 61 to move up and down in directions indicated by arrows "c" and "d" in FIG. 3 between a contact position at which the pickup roller 61 contacts a document sheaf and a separation position at which the pickup roller 61 is away from the document sheaf. The pickup roller 61 picks up several documents (ideally one) out of the documents stacked on the document tray 11 at the contact position.

The sheet feeding belt 62 rotates in the sheet feeding direction. The reverse roller 63 rotates in a reverse direction opposite to the sheet feeding direction. When two or more documents are fed at a time, the reverse roller 63 rotates in the reverse direction with respect to the sheet feeding belt 62. When the reverse roller 63 is in contact with the sheet feeding belt 62 or one sheet of the document is being conveyed, the reverse roller 63 rotates together with the movement of the sheet feeding belt 62 due to the action of a torque limiter. This configuration prevents multiple feeding of the documents.

The pull-out device 52 includes a pull-out roller pair 65, which includes a pair of rollers disposed to face with each other via a conveyance path 52*a*. The pull-out device 52 primarily abuts against and aligns the fed document (corrects the skew of the document) and pulls out and conveys the aligned document in accordance with the drive timings of the pull-out roller pair 65 and the pickup roller 61.

The turn device 53 includes an intermediate roller pair 66 and a reading entrance roller pair 67. Each of the intermediate roller pair 66 and the reading entrance roller pair 67 includes a pair of rollers disposed to face with each other via a conveyance path 53*a*, which is curved from top to bottom. The turn device 53 conveys the document pulled out and conveyed by the intermediate roller pair 66 along the curved conveyance path to turn the document, and conveys, using the reading entrance roller pair 67, the document with the document front face facing downward to the vicinity of a slit glass 7, which is the reading position (imaging position) at which the document is read.

The conveyance speed of the document from the pull-out device 52 to the turn device 53 is higher than the conveyance speed of the document in the first reading conveyor 54. This shortens the time taken for the document to be conveyed to the first reading conveyor 54.

The first reading conveyor 54 includes a first reading roller 68 and a first reading exit roller pair 69. The first reading roller 68 is disposed to face the slit glass 7. The first reading exit roller pair 69 is disposed on a conveyance path 55*a* to which the read document is conveyed. The first reading conveyor 54 conveys the document conveyed to the vicinity of the slit glass 7 with the document front face being brought into contact with the slit glass 7 by the first reading roller 68. At this time, the scanner 101 reads the document through the slit glass 7. At this time, the first carriage 25 and the second carriage 26 of the scanner 101 stop at the home position. The first reading conveyor 54 further conveys, using the first reading exit roller pair 69, the document that has been read.

FIG. 4 is a diagram schematically illustrating a configuration of the ADF 102 in the vicinity of the document reading position. The document is conveyed from left to right in FIG. 4.

As illustrated in FIG. 4, the ADF 102 includes a background member 92 at the position facing the slit glass 7. The background member 92 serves as an imaging background. The background member 92 is, for example, white, and is used for shading correction. A document is conveyed between the slit glass 7 and the background member 92. The scanner 101 reads an image at the position of a reading line illustrated in FIG. 4.

The second reading conveyor 55 includes a second reader 91, a second reading roller 70, and a second reading exit roller pair 71. The second reader 91 reads the back face of the document. The second reading roller 70 is disposed to face the second reader 91 across the conveyance path 55*a*. The second reading exit roller pair 71 is disposed downstream of the second reader 91 in the conveyance direction.

In the second reading conveyor 55, the second reader 91 reads the back face of the document of which the front face has already been read. The second reading exit roller pair 71 conveys the document of which the back face has been read toward a sheet ejection port. The second reading roller 70 restricts floating of the document while the second reader 91 reads the document. The second reading roller 70 also serves as a reference white part used when the second reader 91 obtains shading data. In the case of not performing duplex reading, the document passes through the second reader 91.

The sheet ejector 56 includes a sheet ejection roller pair 72, which is disposed in the vicinity of the sheet ejection port, and ejects the document conveyed by the second reading exit roller pair 71 onto a sheet ejection tray 12.

The ADF 102 also includes various sensors such as an abutment sensor 84, a registration sensor 81, and a sheet ejection sensor 83 along the conveyance path. These sensors are used for conveyance control such as control of the conveyance distance and conveyance speed of the document.

The ADF 102 also includes a document width sensor 85, which is disposed between the pull-out roller pair 65 and the intermediate roller pair 66. The length of the document in the conveyance direction is detected from the motor pulse generated in response to the abutment sensor 84 or the registration sensor 81 reading a front end and a rear end of the document.

Hardware Configuration of Image Processing Device

FIG. 5 is a diagram illustrating an example hardware configuration of the image processing device 200 of the image forming apparatus 100 according to the first embodiment. The hardware configuration of the image processing device 200 of the image forming apparatus 100 according to the present embodiment is described below with reference to FIG. 5.

As illustrated in FIG. 5, the image forming apparatus 100 includes the image processing device 200. The image processing device 200 performs predetermined processing on a document image read by the scanner 101 and then outputs the document image to the plotter 120 as image data.

As illustrated in FIG. 5, the image processing device 200 includes a central processing unit (CPU) 201, a read-only memory (ROM) 202, a main memory (image memory) 205, a chipset 206, an image processing application-specific integrated circuit (ASIC) 207, a controller ASIC 208, a main memory (image memory) 209, and an input/output (I/O) ASIC 210.

The CPU 201 is an arithmetic device that controls the entire operation of the image forming apparatus 100. The ROM 202 is a nonvolatile storage device that stores a program for the image forming apparatus 100. The main memory 205 is an image memory that is used as a work area in which a program for the CPU 201 to control the image forming apparatus 100 is deployed. The main memory 205 also temporarily stores image data to be used.

The chipset 206 is an integrated circuit that is used together with the CPU 201 to control the controller ASIC 208 and the I/O ASIC 210 accessing the main memory 205.

The scanner 101 is a reading device that has a function of reading image data to be copied and image data to be output to an external interface. The plotter 120 is a printer that has a function of printing image data subjected to image processing performed by the controller ASIC 208.

The image processing ASIC 207 is an integrated circuit that performs image processing on image data read by the scanner 101 and outputs the image data to the controller ASIC 208. The image processing ASIC 207 performs image processing to allow the plotter 120 to print the image data from the controller ASIC 208. The image processing ASIC 207 also transmits image data according to the printing timing of the plotter 120. For example, the image processing ASIC 207 performs skew correction on the document.

The controller ASIC 208 is an integrated circuit that uses the main memory 205 via the chipset 206 to rotate and edit the image data to be used by the image forming apparatus 100, accumulates the image data in a hard disk drive (HDD) 211, and transmits and receives the image data to and from the image processing ASIC 207. The main memory 209 is an image memory that stores data to be used by the controller ASIC 208 to perform image processing. The HDD 211 temporarily stores image data subjected to image processing.

The I/O ASIC 210 is an external interface for providing an additional function to the image forming apparatus 100. For example, the I/O ASIC 210 includes interfaces, a hardware accelerator for speeding up image processing, and an encryption processing circuit. Examples of the interfaces include, but are not limited to, a network interface and interfaces for a universal serial bus (USB), a secure digital (SD) card, an operation device, a serial peripheral interface (SPI), an inter-integrated circuit (I2C), and the document width sensor 85.

Functional Configuration and Operation of Image Processing Device

Figure 7:
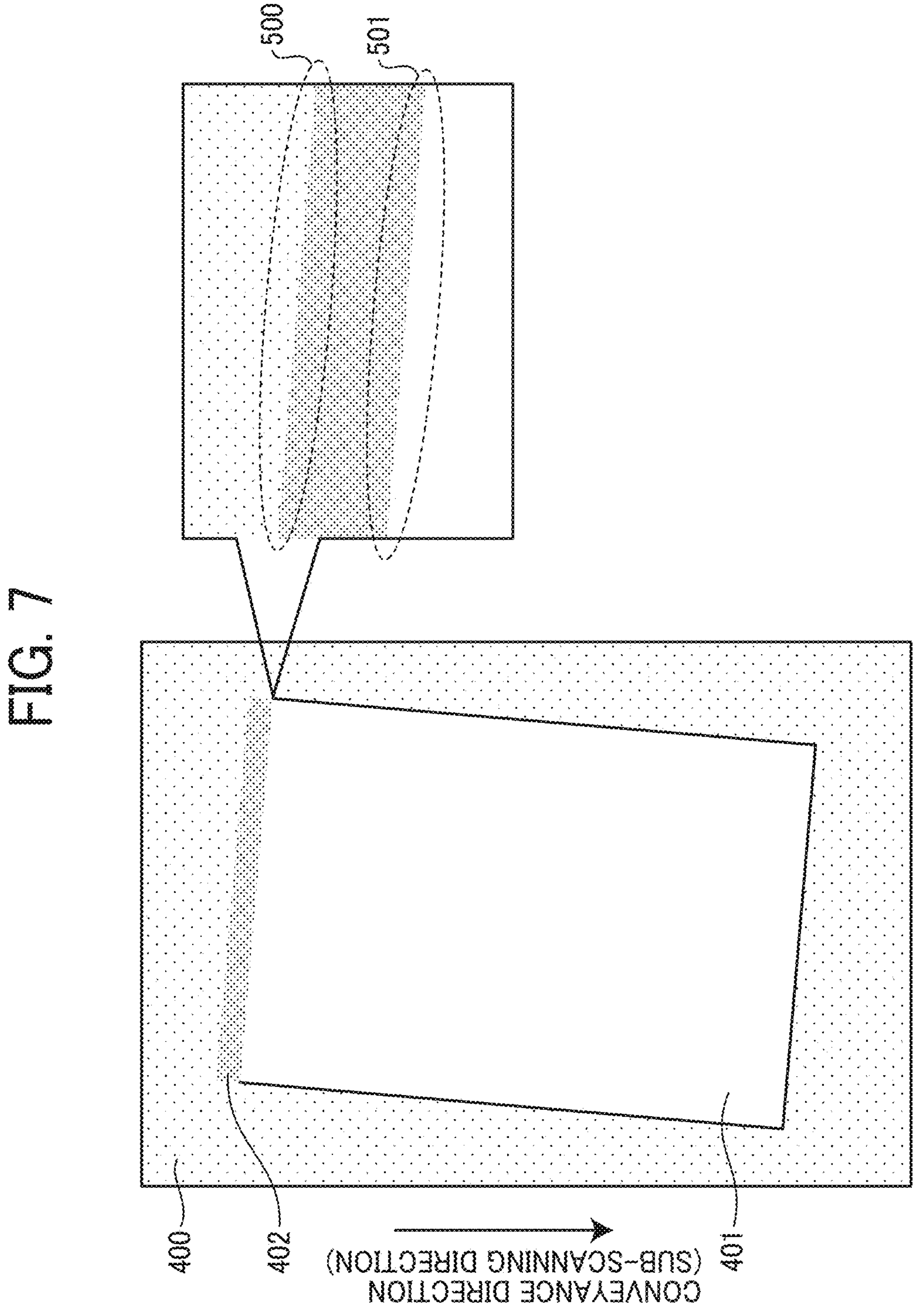
FIG. 7 is a view of example image data obtained by reading a white document.
Figures 9A, 9B, 9C:
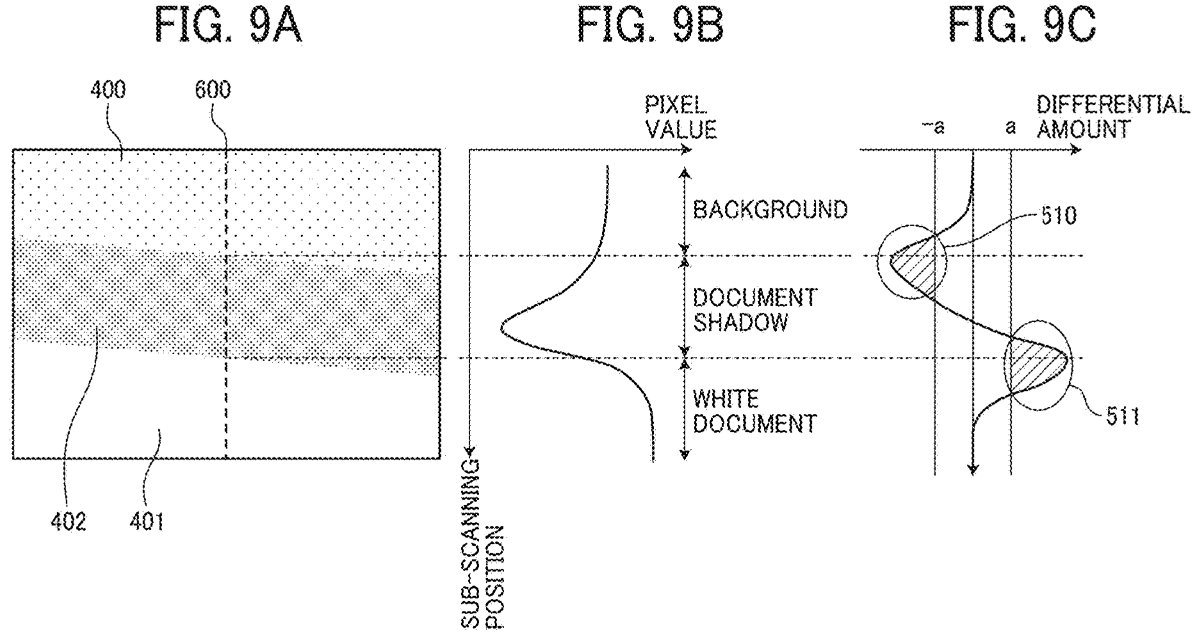
FIGS. 9A to 9C are diagrams for describing an operation of detecting a document edge of the white document.
Figures 10A, 10B, 10C:
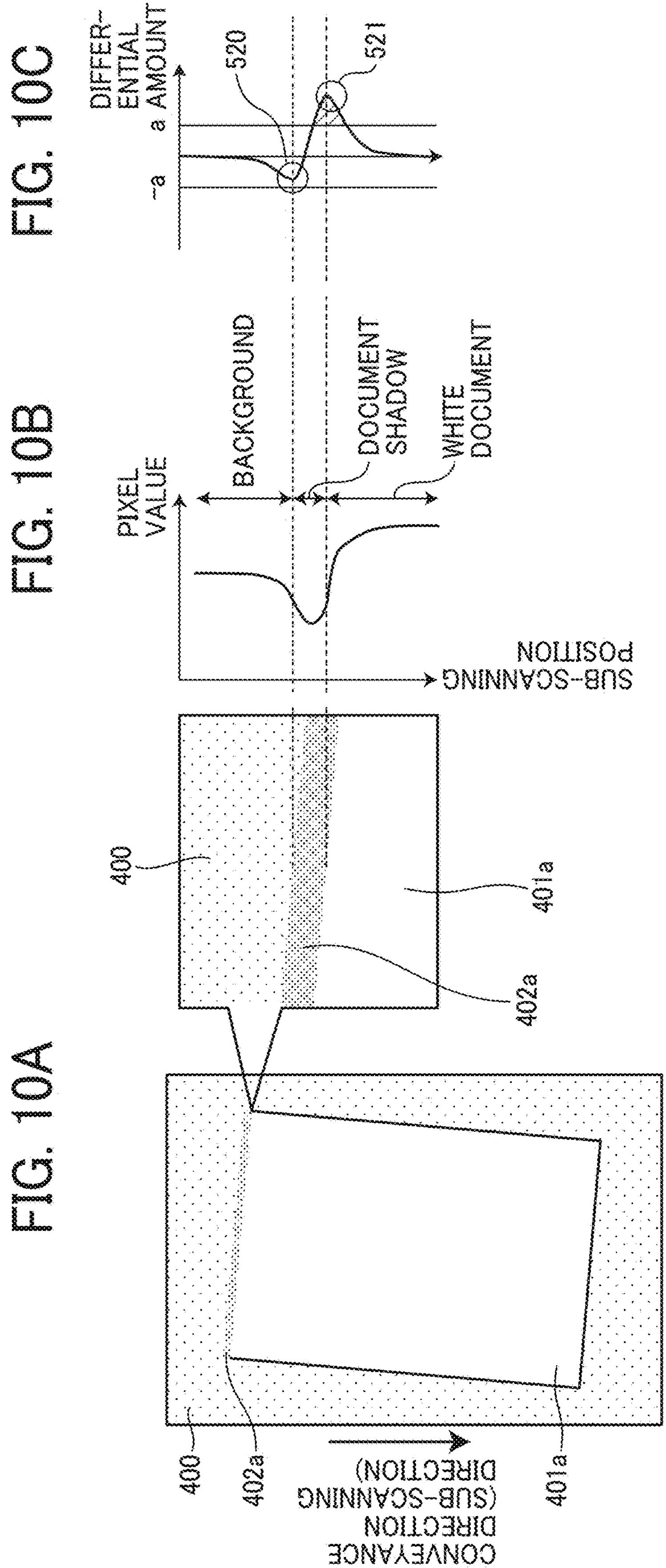
FIGS. 10A to 10C are diagrams for describing an operation of detecting the document edge of the white document when a document shadow is blurry.
Figures 11A, 11B, 11C:
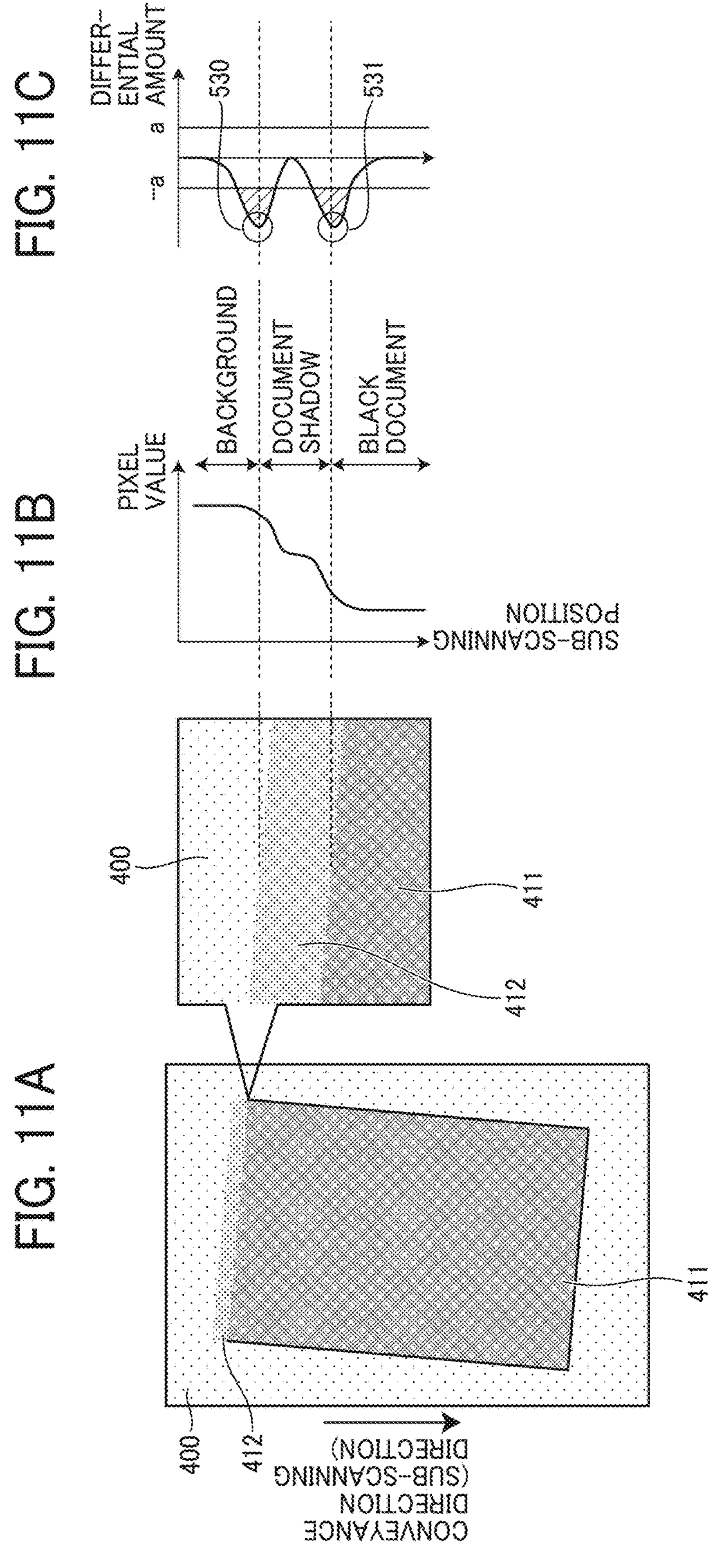
FIGS. 11A to 11C are diagrams for describing an operation of detecting a document edge of a black document.

FIG. 6 is a block diagram illustrating an example functional configuration of the image processing device 200 of the image forming apparatus 100 according to the first embodiment. FIG. 7 is a view of an example image data obtained by reading a white document. FIG. 8 is a diagram illustrating an example differential filter. FIGS. 9A to 9C are diagrams for describing an operation of detecting a document edge of the white document. FIGS. 10A to 10C are diagrams for describing an operation of detecting the document edge of the white document when a document shadow is blurry. FIGS. 11A to 11C are diagrams illustrating an operation of detecting a document edge of a black document. Referring now to FIGS. 6 to 11C, the functional configuration and operation of the image processing device 200 of the image forming apparatus 100 according to the present embodiment are described below.

The image processing device 200 illustrated in FIG. 6 receives image data read by the scanner 101 as input image data and detects an edge (document edge) of a document image (hereinafter simply referred to as a "document") included in the input image data.

FIG. 7 illustrates an example of image data obtained by reading a white document using the scanner 101. In the example illustrated in FIG. 7, the vertical direction corresponds to the sub-scanning direction. As illustrated in FIG. 7, the image data has a white document 401, a background 400, and a document shadow 402. The white document 401 is an image of the white document. The background 400 is an image of the background member 92. The document shadow 402 is an image of a shadow that is cast between the white document 401 and the background member 92. The document shadow 402 has an area 500 and an area 501. The area 500 darkens from the background 400. The area 501 brightens toward the white document 401. In the present embodiment, the image processing device 200 basically performs the following operation to detect the document edge (upper edge) of the document. The image processing device 200 scans from an upper end to a lower end of the image data in the sub-scanning direction, and detects, as a first edge, a boundary between the background 400 and the document shadow 402. The boundary between the background 400 and the document shadow 402 corresponds to the area 500 of the document shadow 402. After that, the image processing device 200 continues to perform scanning and detects, as a second edge, a boundary between the document shadow 402 and the white document 401. The boundary between the document shadow 402 and the white document 401 corresponds to the area 501 of the document shadow 402. Then, the image processing device 200 decides the detected second edge as the document edge.

In the present embodiment, as illustrated in FIG. 7, the upper edge of the document (in FIG. 7, the white document 401) is described as the edge to be detected as the document edge. In another example, the left, right, or lower edge of the document may be detected as the document edge, and the operation described below is also similarly applicable to such cases. The following description focuses on the upper edge of the document and the document shadow corresponding to the upper edge of the document with reference to FIG. 7 and the subsequent drawings.

As illustrated in FIG. 6, the image processing device 200 includes a filter processing section 300 (processing section), an edge detection section 310 (detection section), an edge search determination section 320 (setting section), and a document edge decision section 330 (decision section). Each section is implemented by a circuit such as the image processing ASIC 207.

The filter processing section 300 is a functional section that performs a filter process on input image data using the differential filter illustrated in FIG. 8. Specifically, the filter processing section 300 performs, using the differential filter illustrated in FIG. 8, a convolution operation on pixel values of the input image data in the sub-scanning direction at a predetermined main scanning position 600 illustrated in FIG. 9A to obtain the differential amount of each of the pixel values.

In FIG. 9B, a horizontal axis of the graph indicates a pixel value of each pixel at the main scanning position 600 and a vertical axis of the graph indicates a sub-scanning position. In FIG. 9C, a horizontal axis of the graph indicates the differential amount of each pixel at the main scanning position 600 and a vertical axis of the graph indicates a sub-scanning position. The filter processing section 300 performs, using the differential filter, a filter process on the pixel values at the main scanning position 600 illustrated in the graph of FIG. 9B to obtain the graph of the differential amount illustrated in FIG. 9C. This differential amount is equivalent to the inclination of the graph of the pixel values (the change rate of the pixel values). A negative value indicates a darkening change, while a positive value indicates a brightening change. A predetermined threshold value ±a is set for the differential amount in advance. When the differential amount is equal to or less than a threshold value −a (an example of a first threshold value), the corresponding sub-scanning position is detected as the edge of the darkening change. When the differential amount is equal to or greater than a threshold value a (an example of a second threshold value), the corresponding sub-scanning position is detected as the edge of the brightening change. In the example of the graph of the differential amount illustrated in FIG. 9C, the sub-scanning position corresponding to a portion 510 where the differential amount is equal to or less than the threshold value −a corresponds to the edge of the darkening change (corresponding to the first edge described above), and the sub-scanning position corresponding to a portion 511 where the differential amount is equal to or greater than the threshold value a corresponds to the edge of the brightening change (corresponding to the second edge described above).

The differential filter illustrated in FIG. 8 is an example of a filter of 5×5 size. However, the size of the differential filter is not limited thereto and the differential filter may be of any other size. In the present embodiment, the differential filter illustrated in FIG. 8 is used to detect an edge when the document is scanned in the sub-scanning direction. In another example, the differential filter illustrated in FIG. 8 may be used to detect an edge in the main scanning direction. In this case, the differential filter is transposed when calculated so that a method similar to the one described above is applicable. In the present embodiment, the document edge detection method uses the differential amount obtained by the filter process using the differential filter. However, the document edge detection method is not limited to the one described above. For example, instead of using the differential amount, the document edge detection method may use the difference between the pixel values as disclosed in Japanese Unexamined Patent Application Publication No. 2020-12394. In this case, in the present embodiment, since both the edge of the darkening change and the edge of the brightening change are detected, the difference between the pixel values is expressed with a sign although the difference between the pixel values is expressed as the absolute value in the method disclosed in Japanese Unexamined Patent Application Publication No. 2020-123940. Further, since the differential amount of each pixel value described above indicates the change rate of the pixel values, that is, the amount of change in pixel values per unit change in the sub-scanning direction, the method using the differential amount can also be described as an example of the method using the difference between the pixel values. In other words, the above-described differential amount and the difference between the pixel values are examples of the "value relating to the difference between the pixel values" in the embodiments of the present disclosure.

The edge detection section 310 is a functional section that uses the differential amount obtained by the filter processing section 300 performing the filter process on the pixels aligned in the sub-scanning direction at the specific main scanning position of the input image data (e.g., at the main scanning position 600 illustrated in FIG. 9A) to detect whether the target pixel is a pixel corresponding to the edge. In the example illustrated in FIGS. 9A to 9C, the edge detection section 310 detects whether the target pixel is a pixel corresponding to the portion 510 or the portion 511.

A description is given of a case where a document shadow between the white document and the background is blurry with reference to FIGS. 10A to 10C. For example, when the light source 24 of the scanner 101 is disposed nearly perpendicular to the document or when the document is thin paper or a transparent document such as tracing paper through which part of the light passes, the document shadow tends to be blurry. As illustrated in FIG. 10A, the image data has a white document 401*a*, the background 400, and a document shadow 402*a*. The white document 401*a* is an image of the white document. The background 400 is an image of the background member 92. The document shadow 402*a* is an image of the shadow that is cast between the white document and the background member 92. When the document shadow is blurry, as illustrated in FIG. 10A, the document shadow 402*a* is thinner or brighter in the sub-scanning direction than the document shadow 402 illustrated in FIGS. 7 and 9A to 9C. In this case, in the graph of the differential amount illustrated in FIG. 10C obtained by performing the filter process on the graph of the pixel values illustrated in FIG. 10B using the differential filter, a portion 521, which corresponds to the edge of the boundary between the document shadow 402*a* and the white document 401*a*, is detected as the edge since the differential amount is equal to or greater than the threshold value a. However, a portion 520, which corresponds to the boundary between the background 400 and the document shadow 402*a*, is not detected as the edge since the differential amount is not equal to or less than the threshold value −a. Even in such a case, the image processing device 200 of the image forming apparatus 100 according to the present embodiment successfully detects the edge corresponding to the portion 521 as the document edge. An operation of detecting the document edge by the image processing device 200 is described in detail below with reference to FIGS. 12 and 13.

A description is given of a case where a black document is read with reference to FIGS. 11A to 11C. As illustrated in FIG. 11A, the image data has a black document 411, the background 400, and a document shadow 412. The black document 411 is an image of the black document. The background 400 is an image of the background member 92. The document shadow 412 is an image of the shadow that is cast between the black document and the background member 92. FIG. 11B illustrates a graph of the pixel values. FIG. 11C illustrates a graph of the differential amount obtained by performing the filter process on the graph of the pixel values illustrated in FIG. 11B using the differential filter. In the case of such a black document, the document shadow 412 has an area that darkens from the background 400 and an area that darkens further toward the black document 411. In the present embodiment, the image processing device 200 basically performs the following operation to detect the document edge of the black document. The image processing device 200 scans from an upper end to a lower end of the image data in the sub-scanning direction, and detects, as the first edge, the boundary between the background 400 and the document shadow 412. The boundary between the background 400 and the document shadow 412 corresponds to the area that darkens from the background 400. After that, the image processing device 200 continues to perform scanning and detects, as the second edge, the boundary between the document shadow 412 and the black document 411. The boundary between the document shadow 412 and the black document 411 corresponds to the area that darkens further toward the black document 411. Then, the image processing device 200 decides the second edge as the document edge. Specifically, the edge detection section 310 detects, as the changing edge (corresponding to the first edge described above) that becomes darker from the background 400, the sub-scanning position corresponding to a portion 530 where the differential amount is equal to or less than the threshold value −a. The edge detection section 310 also detects, as the changing edge (corresponding to the second edge described above) that darkens further toward the black document 411, the sub-scanning position corresponding to a portion 531 where the differential amount is equal to or less than the threshold value −a.

In the example illustrated in FIGS. 11A to 11C, the achromatic black document is used. In another example, a high saturation color document may be used. In this case, a process similar to the process described above is applicable by using pixel values of a color that becomes the minimum value among three pixel values of red (R), green (G), and blue (B).

The edge search determination section 320 is a functional section that determines whether to search for the next edge in the sub-scanning direction according to the result of the detection performed by the edge detection section 310. The determination process performed by the edge search determination section 320 will be described later with reference to FIG. 13.

The document edge decision section 330 is a functional section that, when the edge search determination section 320 determines that the search for the next edge is not performed and that the search is completed, decides the last edge detected by the edge detection section 310 as the final document edge. The document edge decision section 330 outputs document edge information including information regarding the sub-scanning position of the document edge. This document edge information is used in a process of correcting a document skew in a later process.

The filter processing section 300, the edge detection section 310, the edge search determination section 320, and the document edge decision section 330 described above are implemented by the CPU 201 illustrated in FIG. 5 executing a program. Part or all of the filter processing section 300, the edge detection section 310, the edge search determination section 320, and the document edge decision section 330 may be implemented by a hardware circuit (integrated circuit) such as field-programmable gate array (FPGA) or ASIC, instead of a program that is software.

Each functional section of the image processing device 200 illustrated in FIG. 6 is a conceptual representation of a function, and the functional configuration of the image processing device 200 is not limited thereto. For example, a plurality of functional sections, each of which is illustrated as an independent functional section of the image processing device 200 in FIG. 6, may be collectively configured as one functional section. In addition, or alternatively, one of the plurality of functional sections of the image processing device 200 illustrated in FIG. 6 may be divided into a plurality of functional sections.

Document Edge Detection Process by Image Forming Apparatus

Figure 12:
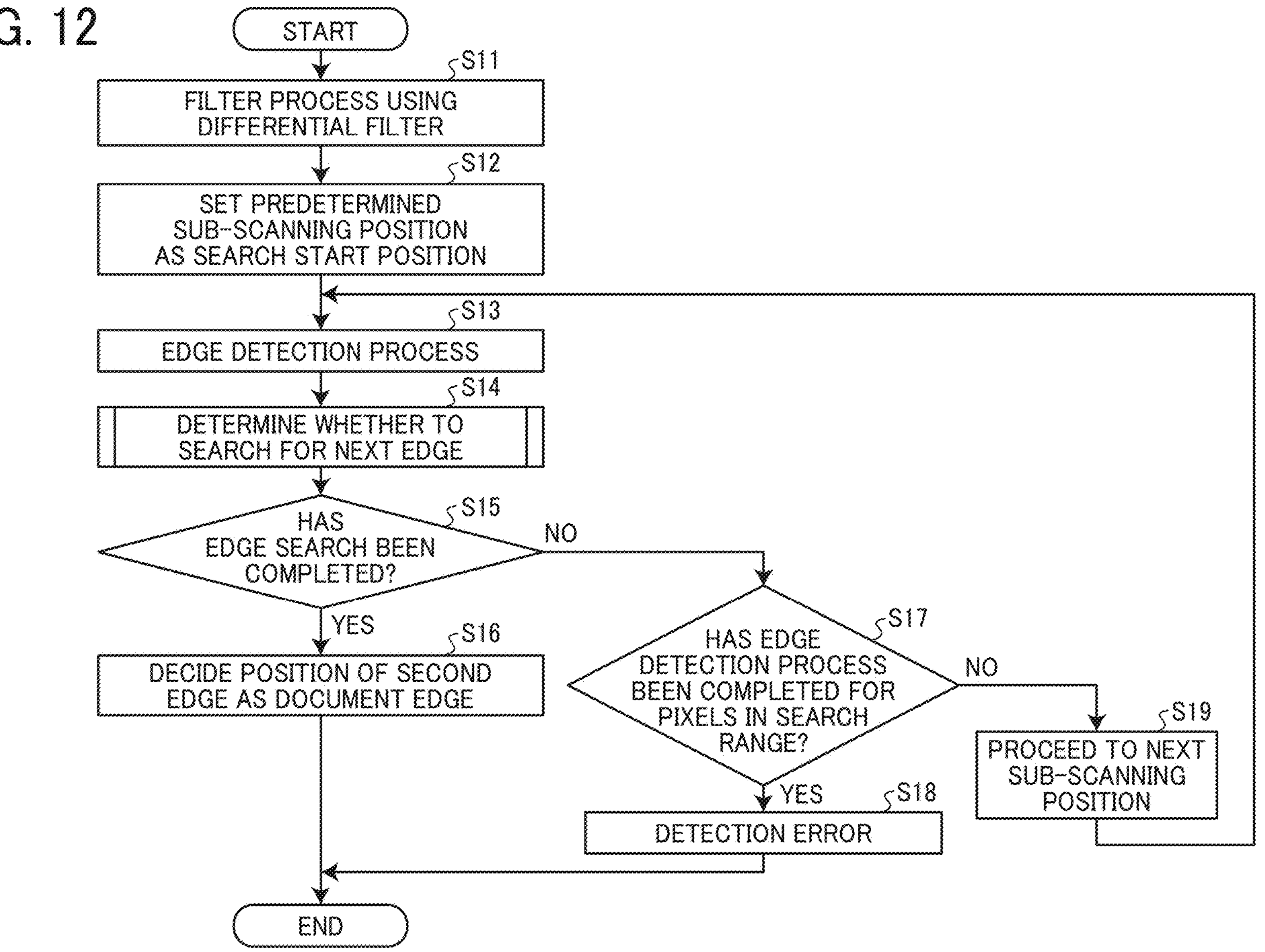
FIG. 12 is a flowchart illustrating an example flow of a document edge detection process performed by the image forming apparatus according to the first embodiment.
Figure 13:
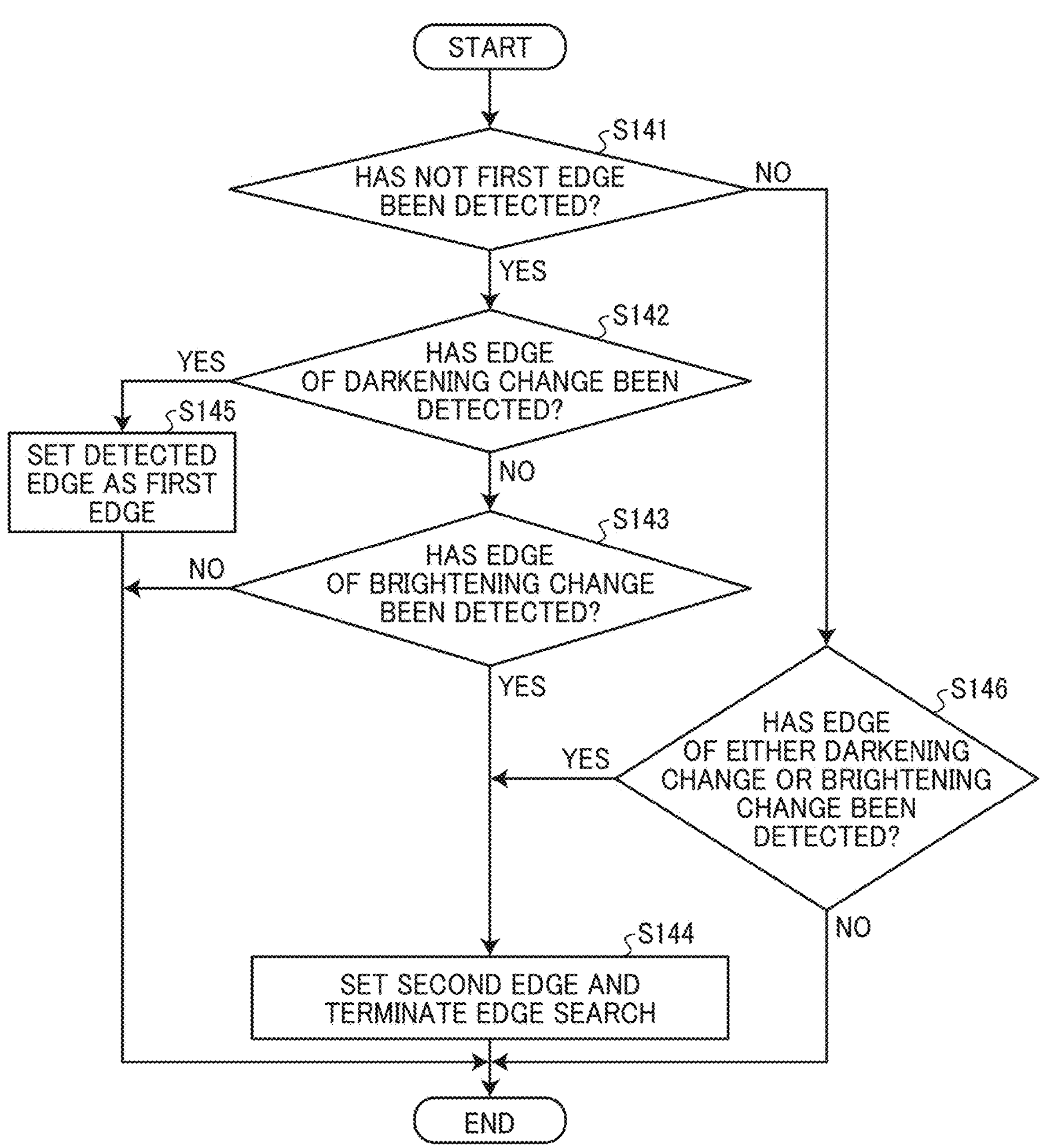
FIG. 13 is a flowchart illustrating an example flow of an edge search determination process performed by the image forming apparatus according to the first embodiment.

FIG. 12 is a flowchart illustrating an example flow of a document edge detection process performed by the image forming apparatus 100 according to the first embodiment. FIG. 13 is a flowchart illustrating an example flow of an edge search determination process performed by the image forming apparatus 100 according to the first embodiment. The flow of the document edge detection process performed by the image forming apparatus 100 according to the present embodiment is described with reference to FIGS. 12 and 13.

Step S11

The filter processing section 300 of the image processing device 200 performs, using the differential filter illustrated in FIG. 8, a convolution operation on pixel values of input image data in the sub-scanning direction at a predetermined main scanning position to obtain the differential amount of each of the pixel values. The filter processing section 300 may perform, using the differential filter, the filter process on the pixel value of the target pixel in each detection process performed by the edge detection section 310 in step S13. Then, the process proceeds to step S12.

Step S12

The edge detection section 310 of the image processing device 200 sets a predetermined sub-scanning position (e.g., the upper end position of the input image data) as the search start position. Specifically, the edge detection section 310 sets a pixel at the search start position as the target pixel. Then, the process proceeds to step S13.

Step S13

The edge detection section 310 detects whether the target pixel corresponds to the edge using the differential amount obtained by the filter processing section 300 performing the filter process. Specifically, when the differential amount of the pixel value corresponding to the target pixel is equal to or less than the threshold value −a or equal to or greater than the threshold value a, the edge detection section 310 detects the target pixel as the pixel corresponding to the edge. When the differential amount of the pixel value corresponding to the target pixel is greater than the threshold value −a and is less than the threshold value a, the edge detection section 310 detects the target pixel as the pixel that does not correspond to the edge. The edge detection section 310 may detect, as the pixel corresponding to the edge, a pixel with a minimum differential amount among successive pixels whose differential amount is equal to or less than the threshold value −a. The edge detection section 310 may also detect, as the pixel corresponding to the edge, a pixel with a maximum differential amount among successive pixels whose differential amount is equal to or greater than the threshold value a. Then, the process proceeds to step S14.

Step S14

The edge search determination section 320 of the image processing device 200 determines whether to further search for the next edge in the sub-scanning direction according to the result of the detection performed by the edge detection section 310. Specifically, the edge search determination section 320 performs the edge search determination process of steps S141 to S146 illustrated in FIG. 13.

Step S141

The edge search determination section 320 determines whether the edge detection section 310 has detected a changing edge, that is, the first edge, that becomes brighter from the background. When the edge search determination section 320 determines that the edge detection section 310 has not detected the first edge (Yes in step S141), the process proceeds to step S142. When the edge search determination section 320 determines that the edge detection section 310 has detected the first edge (No in step S141), the process proceeds to step S146.

Step S142

The edge search determination section 320 determines whether the edge detection section 310 has detected the target pixel as the pixel corresponding to the edge of the darkening change. When the edge search determination section 320 determines that the edge detection section 310 has detected the target pixel as the pixel corresponding to the edge of the darkening change (Yes in step S142), the process proceeds to step S145. When the edge search determination section 320 determines that the edge detection section 310 has not detected the target pixel as the pixel corresponding to the edge of the darkening change (No in step S142), the process proceeds to step S143.

Step S143

The edge search determination section 320 determines whether the edge detection section 310 has detected the target pixel as the pixel corresponding to the edge of the brightening change. When the edge search determination section 320 determines that the edge detection section 310 has detected the target pixel as the pixel corresponding to the edge of the brightening change (Yes in step S143), the process proceeds to step S144. When the edge search determination section 320 determines that the edge detection section 310 has not detected the target pixel as the pixel corresponding to the edge of the brightening change (No in step S143), the edge search determination section 320 determines that the edge detection section 310 has not detected the second edge, and terminates the edge search determination process. Then, the process proceeds to step S15.

Step S144

When the result of the determination in step S143 is Yes, the edge search determination section 320 sets, as the pixel corresponding to the second edge, the target pixel that has been detected by the edge detection section 310 as the pixel corresponding to the edge of the brightening change. When the result of the determination in step S146 is Yes, the edge search determination section 320 sets, as the pixel corresponding to the second edge, the target pixel that has been detected by the edge detection section 310 as the pixel corresponding to the edge of the darkening change or the brightening change. Then, the edge search determination section 320 determines that the edge detection section 310 has detected the second edge, and terminates the edge search determination process. The process then proceeds to step S15.

Step S145

The edge search determination section 320 sets, as the pixel corresponding to the first edge, the target pixel that has been detected by the edge detection section 310 as the pixel corresponding to the edge of the darkening change. Then, the edge search determination section 320 determines that the second edge has not been detected, and terminates the edge search determination process. The process then proceeds to step S15.

Step S146

The edge search determination section 320 determines whether the edge detection section 310 has detected the target pixel as the pixel corresponding to the edge of either the darkening change or the brightening change. When the edge search determination section 320 determines that the edge detection section 310 has detected the target pixel as the pixel corresponding to either edge (Yes in step S146), the process proceeds to step S144. When the edge search determination section 320 determines that the edge detection section 310 has not detected the target pixel as the pixel corresponding to either edge (No in step S146), the edge search determination section 320 determines that the edge detection section 310 has not detected the second edge, and terminates the edge search determination process. The process then proceeds to step S15.

Step S15

When the edge search determination section 320 determines that the second edge has been detected and terminates the edge search (Yes in step S15), the process proceeds to step S16. When the edge search determination section 320 determines that the second edge has not been detected (No in step S15), the process proceeds to step S17.

Step S16

When the edge search determination section 320 determines that the second edge has been detected and determines to terminate the search without searching for the next edge, the document edge decision section 330 of the image processing device 200 decides the second edge as the final document edge. Specifically, the document edge decision section 330 decides the sub-scanning position of the target pixel corresponding to the second edge as the final document edge position. Then, the document edge detection process ends.

Step S17

The edge detection section 310 determines whether the edge detection process has been completed for the pixels in a predetermined search range in the sub-scanning direction. When the edge detection process has been completed for the pixels in the predetermined search range (Yes in step S17), the process proceeds to step $18. When not (No in step S17), the process proceeds to step S19.

Step S18

The document edge decision section 330 outputs a detection error (detection abnormality) indicating a failure of the detection of the document edge. Then, the document edge detection process ends.

Step S19

The edge detection section 310 sets a pixel next to the current target pixel in the sub-scanning direction as the next target pixel and returns to step S13. The pixel next to the current target pixel may be a pixel adjacent to the current target pixel in the sub-scanning direction or may be a pixel a predetermined number of pixels (e.g., the number of pixels in the sub-scanning direction of the differential filter) ahead of the current target pixel.

The image processing device 200 performs the document edge detection process through steps S11 to S19 as described above.

For example, in the case of detecting the document edge of the white document from which the document shadow is cast as illustrated in FIG. 9A, the edge detection section 310 detects the edge of the darkening change at the sub-scanning position of the portion 510 where the image transitions from the background 400 to the document shadow 402, and the edge search determination section 320 sets this edge as the first edge in step S145. At the sub-scanning positions of the subsequent pixels, the edge search determination section 320 determines in step S141 that the first edge has been detected, and the process proceeds to step S146. In front of the sub-scanning position of the portion 511, the edge search determination section 320 determines in step S146 that neither the edge of the darkening change nor the edge of the brightening change has been detected, and continues the edge search process. When the edge search has reached the sub-scanning position of the portion 511 where the image transitions from the document shadow 402 to the white document 401, the edge detection section 310 detects the edge of the brightening change. In step S146, the edge search determination section 320 determines that the edge detection section 310 has detected the edge of the brightening change. In step S144, the edge search determination section 320 sets this edge as the second edge and terminates the edge search process. In step S16, the document edge decision section 330 decides the second edge as the final document edge.

In the case of detecting the document edge of the white document whose document shadow is blurry as illustrated in FIG. 10A, the edge detection section 310 does not detect the edge of the darkening change at the sub-scanning position of the portion 520 where the image transitions from the background 400 to the document shadow 402*a*, and the process proceeds from step S141 to step S142 and further to step S143. In front of the sub-scanning position of the portion 521, the edge search determination section 320 determines in steps S142 and S143 that the edge detection section 310 has not detected any edge. When the edge search has reached the sub-scanning position of the portion 521 where the image transitions from the document shadow 402*a* to the white document 401*a*, the edge detection section 310 detects the edge of the brightening change. In step S143, the edge search determination section 320 determines that the edge detection section 310 has detected the edge of the brightening change. In step S144, the edge search determination section 320 sets this edge as the second edge and terminates the edge search process. In step S16, the document edge decision section 330 decides the second edge as the final document edge.

In the case of detecting the document edge of the black document whose document shadow is cast as illustrated in FIG. 11A, the edge detection section 310 detects the edge of the darkening change at the sub-scanning position of the portion 530 where the image transitions from the background 400 to the document shadow 412, and the edge search determination section 320 sets this edge as the first edge in step S145. At the sub-scanning positions of the subsequent pixels, the edge search determination section 320 determines in step S141 that the first edge has been detected, and the process proceeds to step S146. In front of the sub-scanning position of the portion 531, the edge search determination section 320 determines in step S146 that the edge detection section 310 has not detected either the edge of the darkening change or the brightening change, and continues the edge search process. When the edge search has reached the sub-scanning position of the portion 531 where the image transitions from the document shadow 412 to the black document 411, the edge detection section 310 detects the edge of the darkening change. In step S146, the edge search determination section 320 determines that the edge detection section 310 has detected the edge of the darkening change. In step S144, the edge search determination section 320 sets this edge as the second edge and terminates the edge search process. In step S16, the document edge decision section 330 decides the second edge as the final document edge.

As described above, in the image forming apparatus 100 according to the present embodiment, the filter processing section 300 obtains, from the image data of the document read by the scanner 101, the differential amount of each pixel value in the direction from a background portion to a document portion in the image data. The edge detection section 310 searches for a pixel in this direction and detects an edge based on the differential amount obtained by the filter processing section 300. The edge indicates the boundary between the background portion and the document portion. When the edge detection section 310 firstly detects the edge of the darkening change, the edge search determination section 320 sets this edge as the first edge. When the edge detection section 310 detects the edge of the brightening change before detecting the first edge, the edge search determination section 320 sets this edge as the second edge. When the edge detection section 310 detects the edge of the brightening change or the darkening change after detecting the first edge, the edge search determination section 320 sets this edge as the second edge. The document edge decision section 330 decides the second edge set by the edge search determination section 320 as the document edge of the document. With this configuration, even when the boundary between the background and the document shadow is not detectable, the image forming apparatus 100 successfully detects the document edge with improved accuracy.

The image forming apparatus 100 according to the present embodiment also corrects the skew of the document based on the document edge decided by the document edge decision section 330. For example, the image forming apparatus 100 includes a correction section (correction circuit) that is implemented by, for example, the image processing ASIC 207 and that corrects the skew of the document. Therefore, improvement in the detection accuracy of the document edge leads to improvement in the correction accuracy of the skew.

Second Embodiment

The image forming apparatus 100 according to a second embodiment is described below. The following description focuses on the difference from the image forming apparatus 100 according to the first embodiment. Even when a document shadow between a black document and the background is blurry, the image forming apparatus 100 according to the present embodiment successfully detects the document edge by performing the operation described later. In the present embodiment, the overall configuration of the image forming apparatus 100, the configuration of the scanner 101, the configuration of the ADF 102, and the hardware configuration and functional configuration of the image processing device 200 are similar to those in the first embodiment.

Figures 14A, 14B, 14C:
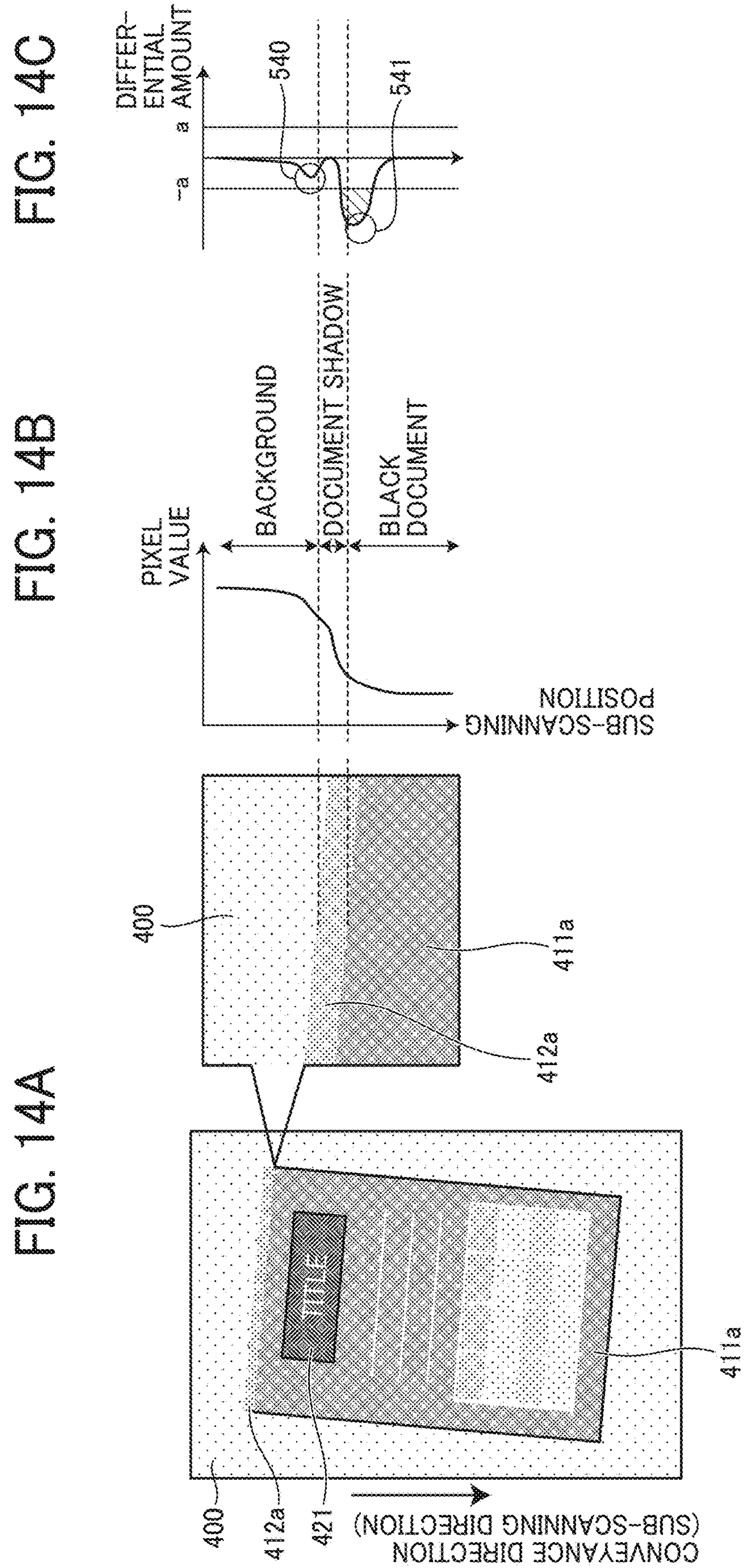
FIGS. 14A to 14C are diagrams for describing an operation of detecting a document edge of a black document when a document shadow is blurry.

In Case where Document Shadow Between Black Document and Background is Blurry FIGS. 14A to 14C are diagrams for describing the operation of detecting a document edge of a black document when a document shadow is blurry. A description is given of the case where the document shadow between the black document and the background is blurry with reference to FIGS. 14A to 14C.

As illustrated in FIG. 14A, the image data has a black document 411*a*, the background 400, and a document shadow 412*a*. The black document 411*a* is an image of the black document. The background 400 is an image of the background member 92. The document shadow 412*a* is an image of the shadow that is cast between the black document and the background member 92. The black document 411*a* includes an image such as a printed portion 421, as illustrated in FIG. 14A.

FIG. 14B illustrates a graph of pixel values. FIG. 14C illustrates a graph of the differential amount obtained by performing the filter process on the graph of the pixel values illustrated in FIG. 14B using the differential filter. In this case, in the graph of the differential amount illustrated in FIG. 14C, a portion 541, which corresponds to the edge of the boundary between the document shadow 412*a* and the black document 411*a*, is detected as the edge since the differential amount is equal to or less than the threshold value −a. On the other hand, a portion 540, which corresponds to the boundary between the background 400 and the document shadow 412*a*, is not detected as the edge since the differential amount is not equal to or less than the threshold value −a. Accordingly, the edge of the darkening change in the portion 541, which corresponds to the edge of the boundary between the document shadow 412*a* and the black document 411*a*, is firstly detected as the first edge, and the search for the next edge continues. In a case where the next edge is not found, a detection error occurs when the search range has passed. In a case where an edge of the printed portion 421 inside the black document 411*a* is detected as the edge, the edge detected as the document edge is significantly deviated from the correct document edge. Even in the case illustrated in FIGS. 14A to 14C, the image processing device 200 of the image forming apparatus 100 according to the present embodiment successfully detects the edge corresponding to the portion 541 as the document edge. An operation of detecting the document edge by the image processing device 200 is described in detail below with reference to FIG. 15.

Document Edge Detection Process Performed by Image Forming Apparatus

Figure 15:
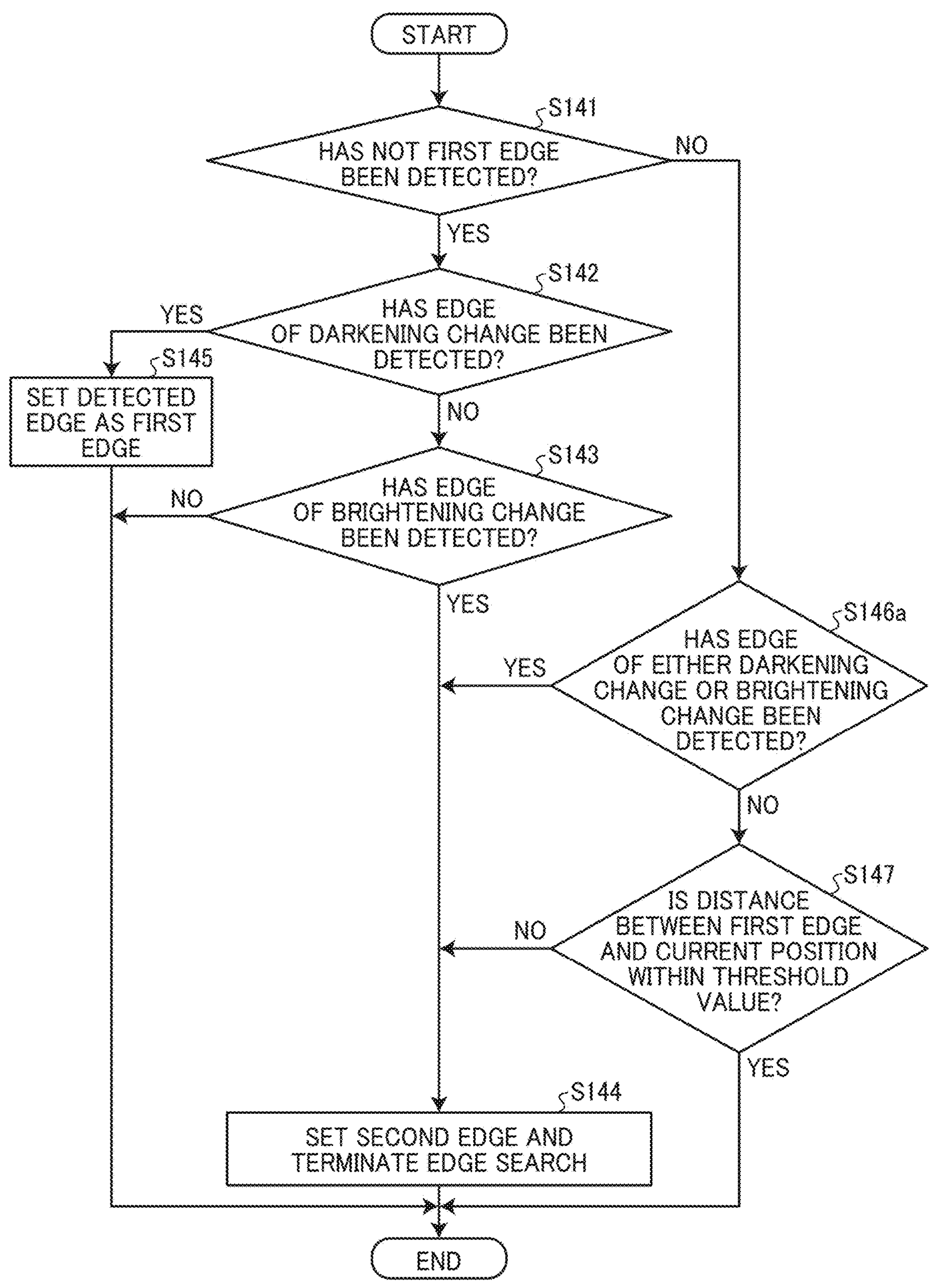
FIG. 15 is a flowchart illustrating an example flow of an edge search determination process performed by the image forming apparatus according to a second embodiment.

FIG. 15 is a flowchart illustrating an example flow of an edge search determination process performed by the image forming apparatus 100 according to the second embodiment. The flow of the edge search determination process of the image forming apparatus 100 according to the present embodiment is described with reference to FIG. 15. An overall flow of a document edge detection process performed by the image forming apparatus 100 according to the present embodiment is similar to the flow of the document edge detection process illustrated in FIG. 12. Therefore, the following description focuses on the edge search determination process corresponding to step S14 performed by the image forming apparatus 100 according to the second embodiment.

Steps S141 to S143

The processes of steps S141 to S143 are similar to the processes of steps S141 to S143 illustrated in FIG. 13. When the edge search determination section 320 determines in step S141 that the edge detection section 310 has detected the first edge (No in step S141), the process proceeds to step S146*a*.

Step S144

When the result of the determination in step S143 is Yes, the edge search determination section 320 sets, as the pixel corresponding to the second edge, the target pixel that has been detected by the edge detection section 310 as the pixel corresponding to the edge of the brightening change. When the result of the determination in step S146*a* is Yes, the edge search determination section 320 sets, as the pixel corresponding to the second edge, the target pixel that has been detected by the edge detection section 310 as the pixel corresponding to the edge of the darkening change or the brightening change. When the result of the determination in step S147 is No, the edge search determination section 320 sets, as the second edge, the first edge that has been firstly detected by the edge detection section 310 as the edge of the darkening change. Then, the edge search determination section 320 determines that the edge detection section 310 has detected the second edge, and terminates the edge search determination process. The process then proceeds to step S15.

Step S145

The process of step S145 is similar to the process of step S145 illustrated in FIG. 13.

Step S146*a*

The edge search determination section 320 determines whether the edge detection section 310 has detected the target pixel as the pixel corresponding to the edge of either the darkening change or the brightening change. When the edge search determination section 320 determines that the edge detection section 310 has detected the target pixel as the pixel corresponding to either edge (Yes in step S146*a*), the process proceeds to step S144. When the edge search determination section 320 determines that the edge detection section 310 has not detected the target pixel as the pixel corresponding to either edge (No in step S146*a*), the process proceeds to step S147.

Step S147

The edge search determination section 320 determines whether the distance between the sub-scanning position of the first edge and the current sub-scanning position, that is, the sub-scanning position of the target pixel, is less than a predetermined threshold value (third threshold value). When the distance is less than the threshold value (Yes in step S147), the edge search determination section 320 determines that the edge detection section 310 has not detected the second edge, and terminates the edge search determination process. Then, the process proceeds to step S15. When the distance is equal to or greater than the threshold value (No in step S147), the process proceeds to step S144.

The threshold value for the distance between the sub-scanning position of the first edge and the current position may be, for example, the maximum possible width of the document shadow. With this configuration, when the edge of the darkening change firstly detected (first edge) is assumed to be the boundary between the background and the document shadow, the edge search advances in the sub-scanning direction as far as the width of the document shadow to detect the next edge. When the next edge is not detected until the far end of the possible width of the document shadow, the firstly detected edge (first edge) is determined as the boundary between the document shadow and the black document, that is, the document edge, not as the boundary between the background and the document shadow.

The image processing device 200 performs the edge search determination process through steps S141 to S145, S146*a*, and S147 as described above.

For example, in the case of detecting the document edge of the black document whose document shadow is blurry as illustrated in FIG. 14A, the edge detection section 310 does not detect the edge of the darkening change at the sub-scanning position of the portion 540 where the image transitions from the background 400 to the document shadow 412*a*. Then, the process proceeds to step S141 to step S142 and further to step S143. In front of the sub-scanning position of the portion 541, the edge search determination section 320 determines in steps S142 and S143 that the edge detection section 310 has detected no edge. When the edge search has reached the sub-scanning position of the portion 541 where the image transitions from the document shadow 412*a* to the black document 411*a*, the edge detection section 310 detects the edge of the darkening change. In step S142, the edge search determination section 320 determines that the edge detection section 310 has detected the edge of the darkening change. In step S145, the edge search determination section 320 sets this edge as the first edge. At the subsequent sub-scanning positions, when the edge search determination section 320 determines in step S146*a* that the edge detection section 310 has detected no edge, the edge search determination section 320 determines in step S147 whether the distance between the sub-scanning position of the first edge and the current sub-scanning position, that is, the sub-scanning position of the target pixel, is less than the predetermined threshold value. When the distance is equal to or greater than the threshold value, the process proceeds to step S144. In step S144, the edge search determination section 320 sets, as the second edge, the first edge that has been firstly detected by the edge detection section 310 as the edge of the darkening change. Then, the edge search determination section 320 terminates the edge search process. In step S16, the document edge decision section 330 decides the second edge as the final document edge.

As described above, in the image forming apparatus 100 according to the present embodiment, after the first edge has been detected, the edge search determination section 320 determines whether the distance between the position of the first edge and the position of the target pixel is less than the predetermined threshold value. When the distance is equal to or greater than the predetermined threshold value, the edge search determination section 320 sets the first edge as the second edge. Accordingly, even when the document shadow between the black document and the background is blurry, the image forming apparatus 100 successfully detects the document edge with high accuracy.

Third Embodiment

The image forming apparatus 100 according to a third embodiment is described below. The following description focuses on the difference from the image forming apparatus 100 according to the first embodiment. Even when noise is generated in an area other than an image area of the document, the image forming apparatus 100 according to the present embodiment successfully detects the document edge by performing the operation as described later. In the present embodiment, the overall configuration of the image forming apparatus 100, the configuration of the scanner 101, the configuration of the ADF 102, and the hardware configuration of the image processing device 200 are similar to those in the first embodiment.

Functional Configuration and Operation of Image Processing Device

Figure 16:
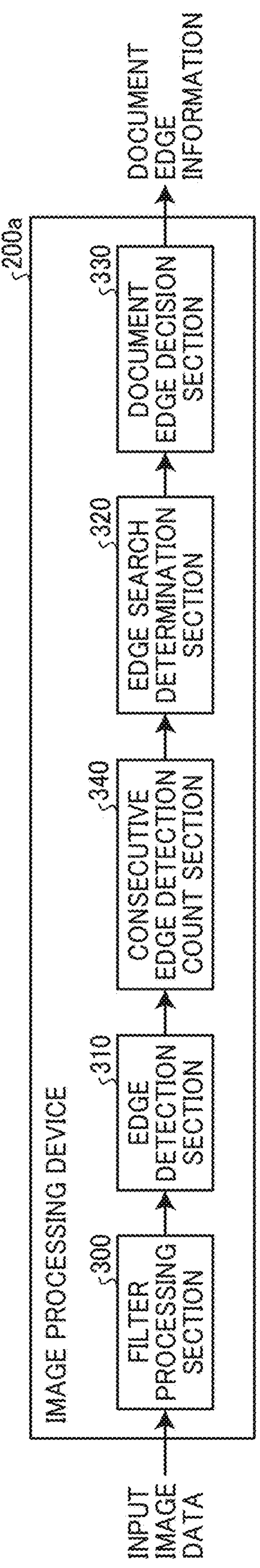
FIG. 16 is a block diagram illustrating an example functional configuration of an image processing device of the image forming apparatus according to a third embodiment.
Figure 17B:
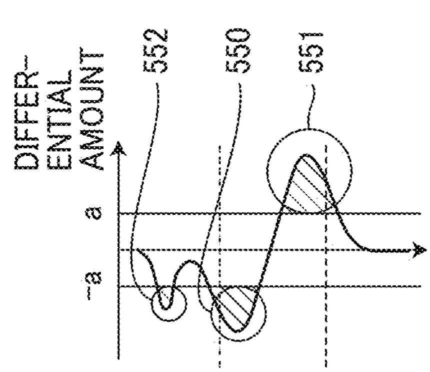
FIGS. 17A and 17B are diagrams for describing an operation of detecting a document edge of a white document when there is a noise.
Figure 17A:
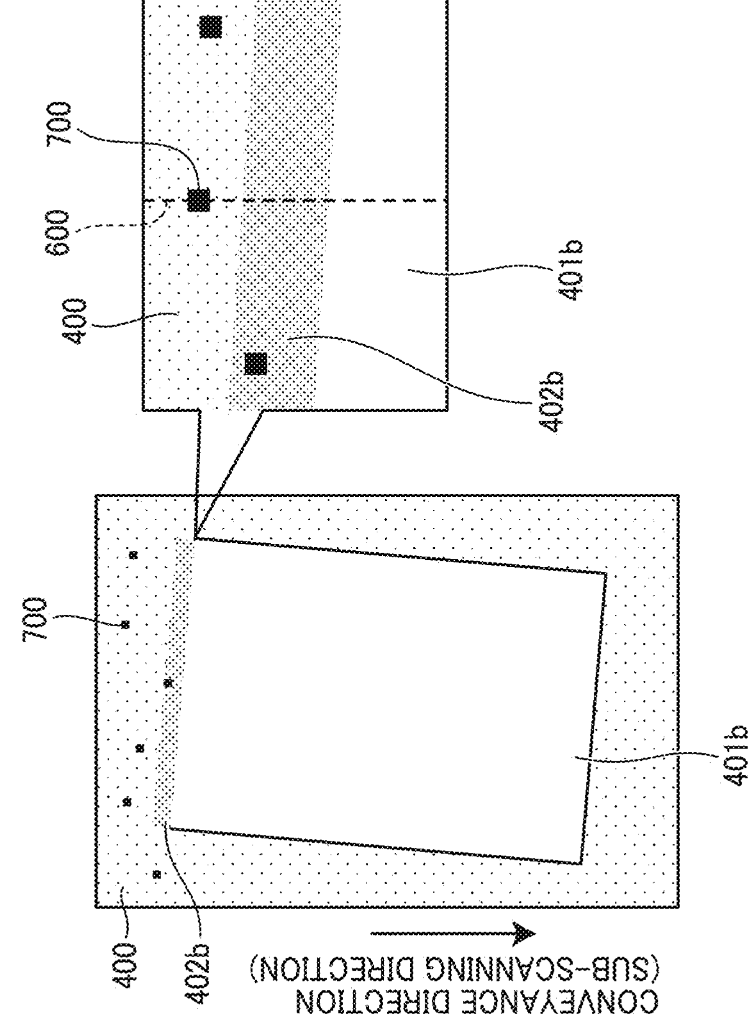

FIG. 16 is a diagram illustrating an example functional configuration of an image processing device 200*a* of the image forming apparatus 100 according to the third embodiment. FIGS. 17A and 17B are diagrams for describing an operation of detecting a document edge of a white document when there is a noise. Referring now to FIG. 16 and FIGS. 17A and 17B, the functional configuration and operation of the image processing device 200*a* of the image forming apparatus 100 according to the present embodiment are described below.

The image processing device 200*a* illustrated in FIG. 16 receives image data read by the scanner 101 as input image data and detects, as the document edge, an edge of the document included in the input image data. As illustrated in FIG. 16, the image processing device 200*a* includes the filter processing section 300 (processing section), the edge detection section 310 (detection section), a consecutive edge detection count section 340 (count section), the edge search determination section 320 (setting section), and the document edge decision section 330 (decision section). The functions of the filter processing section 300, the edge detection section 310, the edge search determination section

320, and the document edge decision section 330 are as described in the first embodiment.

A description is given of a case where the document edge of the document is detected when there is a noise with reference to FIGS. 17A and 17B. As illustrated in FIG. 17A, the image data has a white document 401*b*, the background 400, a document shadow 402*b*, and noises 700. The white document 401*b* is an image of the white document. The background 400 is an image of the background member 92. The document shadow 402*b* is an image of a shadow that is cast between the white document and the background member 92. Each noise 700 is an image of noise that exists in an area other than an image area of the white document 401*b*. For example, the noise 700 is generated when there is dust adhering to the image forming lens 27 of the scanner 101 or the background member 92, or when there is dust adhering to the imaging device 28. FIG. 17B illustrates a graph of the differential amount obtained by performing the filter process on the graph of the pixel values in the sub-scanning direction at the main scanning position 600 using the differential filter. In the graph illustrated in FIG. 17B, it is desirable that a portion 550, which is an area that becomes darker from the background 400 and corresponds to the boundary between the background 400 and the document shadow 402*b*, be detected as the first edge, and a portion 551, which is an area that becomes blighter toward the white document 401*b* and corresponds to the boundary between the document shadow 402*b* and the white document 401*b*, be detected as the second edge. However, when the noises 700 are present in the image area in front of the document shadow 402*b*, the differential amount becomes equal to or less than the threshold value −a in a portion 552, which is not the first edge or the second edge. In this case, there is a possibility that a false edge detection may occur. Even in such a case, the image processing device 200*a* of the image forming apparatus 100 according to the present embodiment successfully detects the edge corresponding to the portion 551 as the document edge. An operation of detecting the document edge by the image processing device 200*a* will be described in detail later with reference to FIG. 18.

The consecutive edge detection count section 340 is a functional section that counts the number of consecutive times a pixel corresponding to the edge of the darkening change or the brightening change has been detected.

The filter processing section 300, the edge detection section 310, the consecutive edge detection count section 340, the edge search determination section 320, and the document edge decision section 330 described above are implemented by the CPU 201 illustrated in FIG. 5 executing a program. Part or all of the filter processing section 300, the edge detection section 310, the consecutive edge detection count section 340, the edge search determination section 320, and the document edge decision section 330 may be implemented by a hardware circuit (integrated circuit) such as FPGA or ASIC, instead of a program that is software.

Each functional section of the image processing device 200*a* illustrated in FIG. 16 is a conceptual representation of a function, and the functional configuration of the image processing device 200*a* is not limited thereto. For example, a plurality of functional sections, each of which is illustrated as an independent functional section of the image processing device 200*a* in FIG. 16, may be collectively configured as one functional section. In addition, or alternatively, one of the plurality of functional sections of the image processing device 200*a* illustrated in FIG. 16 may be divided into a plurality of functional sections.

Document Edge Detection Process by Image Forming Apparatus

FIG. 18 is a flowchart illustrating an example flow of a document edge detection process performed by the image forming apparatus 100 according to the third embodiment. The flow of the document edge detection process performed by the image forming apparatus 100 according to the present embodiment is described with reference to FIG. 18.

Steps S11 to S13

The processes of steps S11 to S13 are similar to the processes of steps S11 to S13 illustrated in FIG. 12. After the process of step S13, the process proceeds to step S20.

Step S20

When the edge detection section 310 has detected an immediately previous target pixel of the current target pixel as the edge, the consecutive edge detection count section 340 determines whether the edge detection section 310 has detected the current target pixel as the edge and whether the detection result of the current target pixel is identical to the detection result of the immediately previous pixel. When the consecutive edge detection count section 340 determines that the edge detection section 310 has detected the current target pixel as the edge and that the detection result of the current target pixel is identical to the detection result of the immediately previous target pixel (Yes in step S20), the process proceeds to step S21. When the consecutive edge detection count section 340 determines that the edge detection section 310 has not detected the current target pixel as the edge or that the detection result of the current target pixel is not identical to the detection result of the immediately previous target pixel (No in step S20), the process proceeds to step S22.

Step S21

The consecutive edge detection count section 340 increments (counts) the number of consecutive times the detection result of the current target pixel obtained by the edge detection section 310 has been identical to the detection result of the immediately previous target pixel obtained by the edge detection section 310. Then, the process proceeds to step S14.

Step S22

The consecutive edge detection count section 340 resets the number of consecutive times incremented each time the detection result of the current target pixel obtained by the edge detection section 310 has been identical to the detection result of the immediately previous target pixel obtained by the edge detection section 310. Then, the process proceeds to step S14.

Step S14

The edge search determination section 320 of the image processing device 200*a* determines whether to further search for the next edge in the sub-scanning direction according to the detection result obtained by the edge detection section 310. Specifically, the edge search determination section 320 performs the edge search determination process of steps S141 to S146 illustrated in FIG. 13. The processes of steps S142 and S143 are performed as described below.

The process of step S14 is not limited to the edge search determination process of steps S141 to S146 illustrated in FIG. 13. In one example, the process of step S14 may be the edge search determination process of steps S141 to S145, S146*a*, and S147 illustrated in FIG. 15.

Step S142

The edge search determination section 320 determines whether the number of consecutive times the target pixel has been detected as the pixel corresponding to the edge of the darkening change, which is incremented by the consecutive edge detection count section 340, exceeds a predetermined threshold value (fourth threshold value). When the number of consecutive times the target pixel has been detected as the pixel corresponding to the edge of the darkening change exceeds the predetermined threshold value, the edge search determination section 320 determines that the edge detection section 310 has detected the target pixel as the pixel corresponding to the edge of the darkening change. When the number of consecutive times the target pixel has been detected as the pixel corresponding to the edge of the darkening change exceeds the predetermined threshold value (Yes in step S142), the process proceeds to step S145. When the number of consecutive times the target pixel has been detected as the pixel corresponding to the edge of the darkening change does not exceed the predetermined threshold value (No in step S142), the process proceeds to step S143.

Step S143

The edge search determination section 320 determines whether the number of consecutive times the target pixel has been detected as the pixel corresponding to the edge of the brightening change, which is incremented by the consecutive edge detection count section 340, exceeds the predetermined threshold value (fourth threshold value). When the number of consecutive times the target pixel has been detected as the pixel corresponding to the edge of the brightening change exceeds the predetermined threshold value, the edge search determination section 320 determines that the edge detection section 310 has detected the target pixel as the pixel corresponding to the edge of the brightening change. When the number of consecutive times the target pixel has been detected as the pixel corresponding to the edge of the brightening change exceeds the predetermined threshold value (Yes in step S143), the process proceeds to step S144. When the number of consecutive times the target pixel has been detected as the pixel corresponding to the edge of the brightening change does not exceed the predetermined threshold value (No in step S143), the edge search determination section 320 determines that the edge detection section 310 has not detected the second edge, and terminates the edge search determination process. Then, the process proceeds to step S15.

As described above, in the image forming apparatus 100 according to the present embodiment, the consecutive edge detection count section 340 counts the number of consecutive times the edge detection section 310 has obtained the detection result of the edge. When the number of consecutive times corresponding to the edge of the darkening change, which is counted by the consecutive edge detection count section 340, exceeds the predetermined threshold value, the edge search determination section 320 determines that the edge detection section 310 has detected the edge of the darkening change. When the number of consecutive times corresponding to the edge of the brightening change, which is counted by the consecutive edge detection count section 340, exceeds the predetermined threshold value, the edge search determination section 320 determines that the edge detection section 310 has detected the edge of the brightening change. With this configuration, even when noise is generated in an area other than the image area of the document, the image forming apparatus 100 successfully detects the document edge with high accuracy.

Fourth Embodiment

The image forming apparatus 100 according to a fourth embodiment is described below. The following description focuses on the difference from the image forming apparatus 100 according to the first embodiment. In the present embodiment, when a pixel value is less than a predetermined threshold value, the image forming apparatus 100 decides the sub-scanning position corresponding to the pixel value as the document edge by performing the operation described later. In the present embodiment, the overall configuration of the image forming apparatus 100, the configuration of the scanner 101, the configuration of the ADF 102, and the hardware configuration of the image processing device 200 are similar to those in the first embodiment.

Functional Configuration and Operation of Image Processing Device

Figure 19:
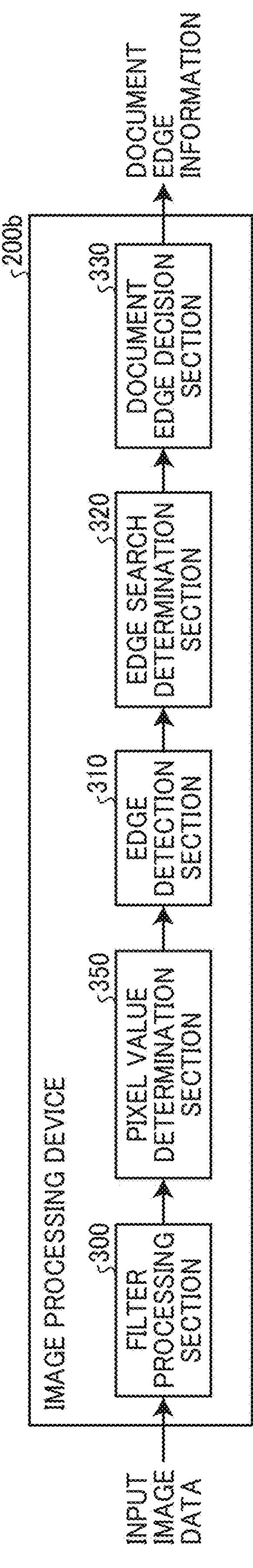
FIG. 19 is a block diagram illustrating an example functional configuration of an image processing device of the image forming apparatus according to a fourth embodiment.

FIG. 19 is a diagram illustrating an example functional configuration of an image processing device 200*b* of the image forming apparatus 100 according to the fourth embodiment. FIGS. 20A to 20C are diagrams for describing an operation of detecting a document edge of a white document when an image is printed in the vicinity of the document edge. Referring now to FIG. 19 and FIGS. 20A to 20C, the functional configuration and operation of the image processing device 200*b* of the image forming apparatus 100 according to the present embodiment are described below.

The image processing device 200*b* illustrated in FIG. 19 receives image data read by the scanner 101 as input image data, and detects, as the document edge, an edge of the document included in the input image data. As illustrated in FIG. 19, the image processing device 200*b* includes the filter processing section 300 (processing section), a pixel value determination section 350 (determination section), the edge detection section 310 (detection section), the edge search determination section 320 (setting section), and the document edge decision section 330 (decision section). The functions of the filter processing section 300, the edge detection section 310, the edge search determination section 320, and the document edge decision section 330 are as described in the first embodiment.

A description is given of a case where a document shadow between the white document and the background is blurry and the white document is black-rimmed with reference to FIGS. 20A to 20C.

As illustrated in FIG. 20A, the image data has a white document 401*c*, the background 400, and a document shadow 402*c*. The white document 401*c* is an image of the white document. The background 400 is an image of the background member 92. The document shadow 402*c* is an image of a shadow that is cast between the white document and the background member 92. The white document 401*c* has, for example, an image of a black rimmed portion 422 as illustrated in FIG. 20A.

FIG. 20B illustrates a graph of pixel values. FIG. 20C illustrates a graph of the differential amount obtained by performing the filter process on the graph of the pixel values illustrated in FIG. 20B using the differential filter. In this case, in the graph of the differential amount illustrated in FIG. 20C, a portion 560, which corresponds to the edge of the boundary between the document shadow 402*c* and the white document 401*c* (rimmed portion 422), is detected as the edge since the differential amount is equal to or less than the threshold value −a. On the other hand, a portion that corresponds to the boundary between the background 400 and the document shadow 402*c* is not detected as the edge since the differential amount is not equal to or less than the threshold value −a. In this case, the portion 560 is detected as the first edge. Further, a portion 561, which corresponds to the boundary between the rimmed portion 422 and a white portion of the white document 401*c*, is equal to or greater than the threshold value a. Accordingly, the portion 561 is detected as the second edge and decided as the document edge. As a result, the edge detected as the document edge is significantly deviated from the correct document edge. To avoid such a situation, the image processing device 200*b* of the image forming apparatus 100 according to the present embodiment decides, as the sub-scanning position of the document edge, the sub-scanning position of a portion 570 where the pixel value is less than a predetermined threshold value b in the graph of the pixel values illustrated in FIG. 20B. An operation of detecting the document edge by the image processing device 200*b* will be described in detail later with reference to FIG. 21.

The pixel value determination section 350 is a functional section that determines whether or not the pixel value of the target pixel is less than the predetermined threshold value b (an example of a fifth threshold value). The threshold value b may be, for example, a minimum possible pixel value of the document shadow.

The filter processing section 300, the pixel value determination section 350, the edge detection section 310, the edge search determination section 320, and the document edge decision section 330 described above are implemented by the CPU 201 illustrated in FIG. 5 executing a program. Part or all of the filter processing section 300, the pixel value determination section 350, the edge detection section 310, the edge search determination section 320, and the document edge decision section 330 may be implemented by a hardware circuit (integrated circuit) such as FPGA or ASIC, instead of a program that is software.

Each functional section of the image processing device 200*b* illustrated in FIG. 19 is a conceptual representation of a function, and the functional configuration of the image processing device 200*b* is not limited thereto. For example, a plurality of functional sections, each of which is illustrated as an independent functional section of the image processing device 200*b* in FIG. 19, may be collectively configured as one functional section. In addition, or alternatively, one of the plurality of functional sections of the image processing device 200*b* illustrated in FIG. 19 may be divided into a plurality of functional sections.

Document Edge Detection Process by Image Forming Apparatus

Figure 21:
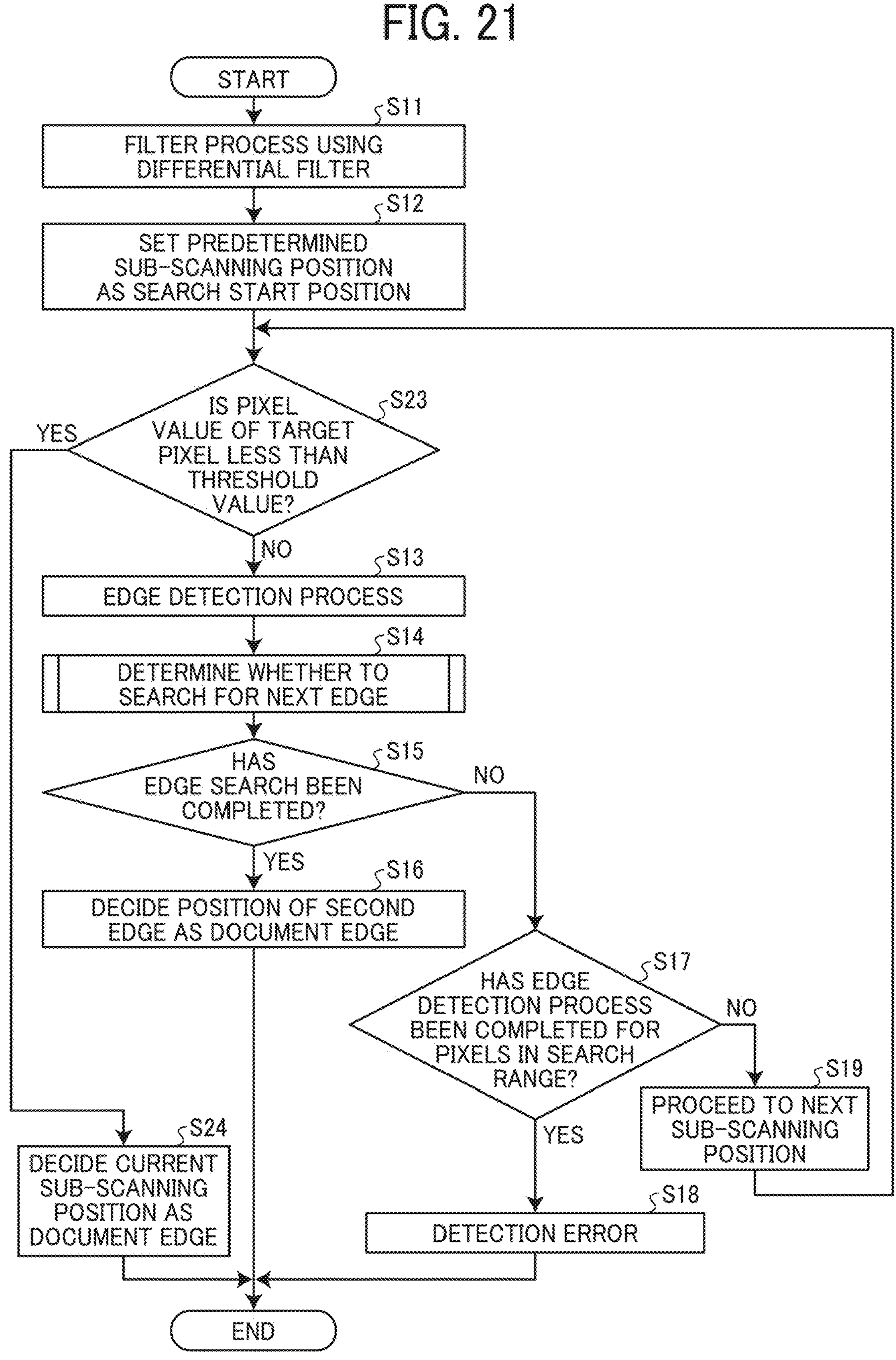
FIG. 21 is a flowchart illustrating an example flow of a document edge detection process performed by the image forming apparatus according to the fourth embodiment.

FIG. 21 is a flowchart illustrating an example flow of a document edge detection process performed by the image forming apparatus 100 according to the fourth embodiment. The flow of the document edge detection process performed by the image forming apparatus 100 according to the present embodiment is described with reference to FIG. 21.

Steps S11 and S12

The processes of steps S11 and S12 are similar to the processes of steps S11 and S12 illustrated in FIG. 12. After the process of step S12, the process proceeds to step S23.

Step S23

The pixel value determination section 350 of the image processing device 200*b* determines whether the pixel value of the target pixel is less than the predetermined threshold value b. When the pixel value of the target pixel is less than the threshold value b (Yes in step S23), the process proceeds to step S24. When the pixel value of the target pixel is equal to or greater than the threshold value b (No in step S23), the process proceeds to step S13.

Step S24

The document edge decision section 330 of the image processing device 200*b* sets the target pixel as the second edge and decides the second edge as the final document edge. Specifically, the document edge decision section 330 decides, as the final document edge position, the sub-scanning position of the target pixel set as the second edge. With this configuration, even when the document shadow between the white document and the background is blurry and the white document has a black rimmed portion, the image forming apparatus 100 successfully detects the document edge with improved accuracy. After the process of step S24, the document edge detection process ends.

Steps S13 to S19

The processes of steps S13 to S19 are similar to the processes of steps S13 to S19 illustrated in FIG. 12. After the process of step S19, the process returns to step S23.

As described above, in the image forming apparatus 100 according to the present embodiment, the pixel value determination section 350 determines whether the pixel value of the target pixel is less than the predetermined threshold value. When the pixel value determination section 350 determines that the pixel value of the target pixel is less than the predetermined threshold value, the document edge decision section 330 decides the position of the target pixel as the position of the document edge. With this configuration, even when the document shadow between the white document and the background is blurry and the white document has a black rimmed portion, the image forming apparatus 100 successfully detects the document edge with improved accuracy.

When at least one of the functional sections of each of the image processing devices 200, 200*a*, and 200*b* of the image forming apparatus 100 according to the above-described embodiments is implemented by execution of a program, such a program may be installed in a ROM or any desired memory in advance. Alternatively, the program executed by the image processing devices 200, 200*a*, and 200*b* of the image forming apparatus 100 according to the above-described embodiments may be recorded in a computer-readable recording medium such as a compact disc read only memory (CD-ROM), a flexible disk (FD), a compact disk-recordable (CD-R), or a digital versatile disc (DVD) and provided as a file in an installable format or an executable format. Further, the program executed by the image processing devices 200, 200*a*, and 200*b* of the image forming apparatus 100 according to the above-described embodiments may be stored on a computer connected to a network such as the Internet and downloaded via the network. Further, the program executed by the image processing devices 200, 200*a*, and 200*b* of the image forming apparatus 100 according to the above-described embodiments may be provided or distributed via a network such as the Internet. The program executed by the image processing devices 200, 200*a*, and 200*b* of the image forming apparatus 100 according to the above-described embodiments has a module configuration including at least one of the above-described functional sections. As the actual hardware relating to the program, the CPU 201 reads and executes the program from the above-described storage device so that the above-described functional sections are loaded onto the main storage device and implemented.

Aspects of the present disclosure are, for example, as follows.

An image processing device according to a first aspect includes a processing section, a detection section, a setting section, and a decision section. The processing section obtains, from image data of a document read by a reading device, a value relating to a difference between pixel values of adjacent pixels in a direction from a background portion to a document portion in the image data. The detection section searches for a pixel in the direction and detects an edge based on the value relating to the difference obtained by the processing section. The edge indicates a boundary between the background portion and the document portion. When the detection section firstly detects the edge of a darkening change, the setting section sets the detected edge as a first edge. When the detection section detects the edge of the brightening change before detecting the first edge, the setting section sets the detected edge as a second edge. When the detection section detects the edge of the darkening change or the edge of the brightening change after detecting the first edge, the setting section sets the detected edge as the second edge. The decision section decides the second edge set by the setting section as a document edge of the document.

In a second aspect, in the image processing device according to the first aspect, the processing section performs, using a differential filter, a filter process on pixel values of pixels in the direction to obtain a differential amount of each of the pixel values as the value relating to the difference.

In a third aspect, in the image processing device according to the second aspect, when the differential amount corresponding to a pixel value of a target pixel is equal to or less than a first threshold value, the detection section detects the target pixel as the edge of the darkening change. When the differential amount corresponding to the pixel value of the target pixel is equal to or greater than a second threshold value greater than the first threshold value, the detection section detects the target pixel as the edge of the brightening change.

In a fourth aspect, in the image processing device according to any one of the first to third aspects, after the detection section detects the first edge, the setting section determines whether a distance between a position of the first edge and a position of a target pixel is less than a third threshold value. When the distance is equal to or greater than the third threshold value, the setting section sets the first edge as the second edge.

In a fifth aspect, in the image processing device according to the fourth aspect, the third threshold value is a maximum possible width of a document shadow of the document.

In a sixth aspect, the image processing device according to any one of the first to fifth aspects further includes a count section. The count section counts the number of consecutive times the detection section has obtained a detection result of the edge. When the number of consecutive times corresponding to the edge of the darkening change counted by the count section exceeds a fourth threshold value, the setting section determines that the detection section has detected the edge of the darkening change. When the counted number of consecutive times corresponding to the edge of the brightening change counted by the count section exceeds the fourth threshold value, the setting section determines that the detection section has detected the edge of the brightening change.

In a seventh aspect, the image processing device according to any one of the first to sixth aspects further includes a determination section. The determination section determines whether a pixel value of a target pixel is less than a fifth threshold value. When the determination section determines that the pixel value of the target pixel is less than the fifth threshold value, the decision section decides a position of the target pixel as a position of the document edge.

In an eighth aspect, the image processing device according to any one of the first to seventh aspects, the detection section determines whether a process of detecting the edge has been completed for pixels included in a predetermined search range in the direction. When the detection section determines that the process of detecting the edge has been completed for the pixels included in the predetermined search range in the direction, the decision section outputs a detection error indicating a failure of detection of the document edge.

In a ninth aspect, the image processing device according to any one of the first to eighth aspects further includes a correction section. The correction section corrects a skew of the document based on the document edge decided by the decision section.

An edge detection method according to a tenth aspect includes a processing step of obtaining, from image data of a document read by a reading device, a value relating to a difference between pixel values of adjacent pixels in a direction from a background portion to a document portion in the image data, a detection step of searching for a pixel in the direction and detecting an edge based on the value relating to the difference, the edge indicating a boundary between the background portion and the document portion, and a setting step of setting the detected edge as a first edge or a second edge. The setting step includes, when the edge of a darkening change is firstly detected, setting the detected edge as the first edge, when the edge of the brightening change is detected before the first edge is detected, setting the detected edge as the second edge, and when the edge of the darkening change or the edge of the brightening change is detected after the first edge is detected, setting the detected edge as the second edge. The edge detection method further includes a decision step of deciding the set second edge as a document edge of the document.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An image processing device comprising:

a processing circuit configured to obtain, from image data of a document read by a reading device, a difference between pixel values of adjacent pixels in a sub-scanning direction from a background portion to a document portion in the image data, wherein the processing circuit is configured to obtain a differential amount of each of the pixel values as the difference;

a detection circuit configured to search for a pixel in the sub-scanning direction and detect an edge based on the difference to obtain a detected edge, the detected edge indicating a boundary between the background portion and the document portion;

a setting circuit configured to, in response to the detection circuit firstly detecting the edge of a darkening change, set the detected edge as a first edge, wherein, in response to the differential amount corresponding to a pixel value of a target pixel being equal to or less than a first threshold value, the detection circuit is configured to detect the target pixel as the edge of the darkening change;

in response to the detection circuit detecting the edge of a brightening change before detecting the first edge, set the detected edge as a second edge, wherein, in response to the differential amount corresponding to the pixel value of the target pixel being equal to or greater than a second threshold value greater than the first threshold value, the detection circuit is configured to detect the target pixel as the edge of the brightening change; and in response to the detection circuit detecting the edge of the darkening change or the edge of the brightening change after detecting the first edge, set the detected edge as the second edge; and a decision circuit configured to decide the second edge as a document edge of the document, wherein the setting circuit is configured to, after the detection circuit detects the first edge, determine whether a distance between a position of the first edge and a position of the target pixel is less than a third threshold value; and in response to the distance being equal to or greater than the third threshold value, set the first edge as the second edge.

2. The image processing device according to claim 1, wherein the processing circuit is configured to perform, using a differential filter, a filter process on the pixel values of pixels in the sub-scanning direction to obtain the differential amount of each of the pixel values as the difference.

3. The image processing device according to claim 1, wherein the third threshold value is a maximum possible width of a document shadow of the document.

4. The image processing device according to claim 1, further comprising a count circuit configured to count a number of consecutive times the detection circuit has obtained a detection result of the edge, wherein the setting circuit is configured to, in response to the number of consecutive times corresponding to the edge of the darkening change exceeding a fourth threshold value, determine that the detection circuit has detected the edge of the darkening change; and in response to the number of consecutive times corresponding to the edge of the brightening change exceeding the fourth threshold value, determine that the detection circuit has detected the edge of the brightening change.

5. The image processing device according to claim 1, further comprising a determination circuit configured to determine whether the pixel value of the target pixel is less than a fifth threshold value, wherein the decision circuit is configured to, in response to the determination circuit determining that the pixel value of the target pixel is less than the fifth threshold value, decide the position of the target pixel as a position of the document edge.

6. The image processing device according to claim 1, wherein the detection circuit is configured to determine whether a process of detecting the edge has been completed for pixels included in a first search range in the sub-scanning direction, and the decision circuit is configured to, in response to the detection circuit determining that the process of detecting the edge has been completed for the pixels included in the first search range in the sub-scanning direction, output a detection error indicating a failure of detection of the document edge.

7. The image processing device according to claim 1, further comprising a correction circuit configured to correct a skew of the document based on the document edge decided by the decision circuit.

8. An image forming apparatus comprising:

the image processing device according to claim 1; and the reading device to read the document as the image data.

9. The image forming apparatus according to claim 8, further comprising a printer to print the image data subjected to image processing by the image processing device.

10. An edge detection method comprising:

obtaining, from image data of a document read by a reading device, a difference between pixel values of adjacent pixels in a sub-scanning direction from a background portion to a document portion in the image data, wherein the obtaining obtains a differential amount of each of the pixel values as the difference;

searching for a pixel in the sub-scanning direction and detecting an edge based on the difference to obtain a detected edge, the detected edge indicating a boundary between the background portion and the document portion;

setting the detected edge as a first edge or a second edge, the setting including, in response to the edge of a darkening change being firstly detected, setting the detected edge as the first edge, wherein, in response to the differential amount corresponding to a pixel value of a target pixel being equal to or less than a first threshold value, the detecting detects the target pixel as the edge of the darkening change;

in response to the edge of a brightening change being detected before the first edge is detected, setting the detected edge as the second edge, wherein, in response to the differential amount corresponding to the pixel value of the target pixel being equal to or greater than a second threshold value greater than the first threshold value, the detecting detects the target pixel as the edge of the brightening change; and in response to the edge of the darkening change or the edge of the brightening change being detected after the first edge is detected, setting the detected edge as the second edge; and deciding the second edge as a document edge of the document, wherein the setting includes, after the first edge is detected, determining whether a distance between a position of the first edge and a position of the target pixel is less than a third threshold value; and in response to the distance being equal to or greater than the third threshold value, setting the first edge as the second edge.

11. The edge detection method according to claim 10, wherein the obtaining includes performing, using a differential filter, a filter process on the pixel values of pixels in the sub-scanning direction to obtain the differential amount of each of the pixel values as the difference.

12. The edge detection method according to claim 10, wherein the third threshold value is a maximum possible width of a document shadow of the document.

13. The edge detection method according to claim 10, wherein the detecting further includes counting a number of consecutive times a detection result of the edge has been obtained, and the setting includes, in response to the number of consecutive times corresponding to the edge of the darkening change exceeding a fourth threshold value, determining that the edge of the darkening change has been detected; and in response to the number of consecutive times corresponding to the edge of the brightening change exceeding the fourth threshold value, determining that the edge of the brightening change has been detected.

14. The edge detection method according to claim 10, further comprising determining whether the pixel value of the target pixel is less than a fifth threshold value, wherein the deciding includes, in response to the pixel value of the target pixel being determined to be less than the fifth threshold value, deciding the position of the target pixel as a position of the document edge.

15. The edge detection method according to claim 10, wherein the detecting includes determining whether a process of detecting the edge has been completed for pixels included in a first search range in the sub-scanning direction, and the deciding includes, in response to the process of detecting the edge being determined to have been completed for the pixels included in the first search range in the sub-scanning direction, outputting a detection error indicating a failure of detection of the document edge.

16. The edge detection method according to claim 10, further comprising correcting a skew of the document based on the document edge.

* * * * *